(12) United States Patent
Podhola

(10) Patent No.: US 12,234,800 B2
(45) Date of Patent: Feb. 25, 2025

(54) OFFSHORE FLOATER SYSTEM

(71) Applicant: Kamil Podhola, Liberec (CZ)

(72) Inventor: Kamil Podhola, Liberec (CZ)

( * ) Notice: Subject to any disclaimer, the term of this patent is extended or adjusted under 35 U.S.C. 154(b) by 0 days.

(21) Appl. No.: 17/896,115

(22) Filed: Aug. 26, 2022

(65) Prior Publication Data
US 2024/0068434 A1 Feb. 29, 2024

(51) Int. Cl.
F03B 13/18 (2006.01)
B63B 35/44 (2006.01)
H02K 7/18 (2006.01)

(52) U.S. Cl.
CPC .............. *F03B 13/18* (2013.01); *B63B 35/44* (2013.01); *H02K 7/1823* (2013.01); *B63B 2035/4466* (2013.01)

(58) Field of Classification Search
CPC . F03B 13/18; B63B 35/44; B63B 2035/4466; H02K 7/1823; Y02E 10/30
See application file for complete search history.

(56) References Cited

U.S. PATENT DOCUMENTS

| | | | | |
|---|---|---|---|---|
| 2,848,189 A * | 8/1958 | Caloia | ................. | F03B 13/1815 60/505 |
| 4,389,843 A * | 6/1983 | Lamberti | ............ | F03B 13/1815 60/507 |
| 4,454,429 A * | 6/1984 | Buonome | ............... | F03B 13/18 60/495 |
| 6,647,716 B2 * | 11/2003 | Boyd | .................. | F03B 13/1815 60/413 |
| 8,018,079 B2 * | 9/2011 | Kelly | ........................ | F03D 9/11 290/55 |
| 8,884,457 B1 * | 11/2014 | Jones | ........................ | H02P 9/04 290/43 |
| 8,943,821 B2 * | 2/2015 | Hagemann | .......... | F03B 13/1825 60/505 |
| 9,127,640 B2 * | 9/2015 | Rohrer | .................... | F03B 13/14 |
| 9,309,860 B2 * | 4/2016 | Hon | ........................ | F03B 13/16 |
| 9,702,335 B2 * | 7/2017 | Chen | ..................... | F03B 13/187 |
| 9,863,395 B2 * | 1/2018 | Rohrer | ................... | F03B 13/182 |
| 10,094,356 B2 * | 10/2018 | Rohrer | ..................... | H02K 7/18 |
| 10,190,568 B2 * | 1/2019 | Gregory | ............. | F03B 13/1895 |
| 10,938,274 B2 * | 3/2021 | Sauchyn | ............... | F03B 13/264 |
| 11,028,818 B2 * | 6/2021 | Rosenberg | ............. | B63B 22/18 |
| 2002/0195823 A1 * | 12/2002 | Aguirre | ................ | F03B 13/184 290/53 |

(Continued)

Primary Examiner — Jesse S Bogue

(57) ABSTRACT

The invention relates to an offshore floater system for a wave electricity generator (OFS) comprising one or more lever arms coupled with one or more floaters, wherein the lever arms can be rotatably coupled with a base floater and the system can be configured to follow contours of waves and to be able to change an effective length of the lever arm according to wave parameters. The floaters can be differently sized, can have defined forms. The OFS can be installed off shore, anchored to be able to react on a water level change, mounted to react on a wave direction. The lever arms can be coupled with an electric energy generator which can be homopolar and coupled with a defined electrocomponent. The lever arms can be coupled with a defined mechanocomponent. An offshore floater method for generating wave electricity is proposed based upon the proposed system.

15 Claims, 7 Drawing Sheets

(56) References Cited

U.S. PATENT DOCUMENTS

| | | | |
|---|---|---|---|
| 2008/0025852 A1* | 1/2008 | Davis | F03B 13/1865 417/331 |
| 2010/0213718 A1* | 8/2010 | Kelly | F03D 5/04 290/55 |
| 2011/0012358 A1* | 1/2011 | Brewster | F03B 13/20 310/11 |
| 2011/0018275 A1* | 1/2011 | Sidenmark | F03B 13/1815 290/53 |
| 2011/0121572 A1* | 5/2011 | Levchets | F03B 13/20 290/53 |
| 2012/0001431 A1* | 1/2012 | Smith | E02B 17/0004 290/53 |
| 2014/0252766 A1* | 9/2014 | Clark | F03B 13/1845 290/53 |
| 2020/0049125 A1* | 2/2020 | O'Donncha | F03B 13/14 |
| 2022/0290647 A1* | 9/2022 | Foster | B63B 35/44 |
| 2023/0002012 A1* | 1/2023 | Hayman | F03B 13/264 |

\* cited by examiner element 105 added

OFFSHORE FLOATER SYSTEM

TECHNICAL FIELD

The invention relates to an offshore floater system for a wave electricity generator.

BACKGROUND ART

There is a wide range of the waves electricity generators. They may use reservoirs and turbines, pumps and turbines, rotate various gears driving an electrical generator, use horizontal vector element of wave motion to turn a shaft driving a turbine, use differential height of the tide to drive a gear arrangement, employ concentric buoys, comprise magnetic elements, floaters, rotatable arms, high pressure systems, energy accumulators, etc. There are pumping systems with piston pumps connected to floats and rocked by wave movements. Large systems may translate a large portion of total wave energy and small systems may translate the wave energy in small areas but can be less susceptible to damage from water or wind currents, storms or other inclement weather. Small devices ought to make use of the available energy in each wave more efficiently than large devices to become an useful offshore application. Small devices can have an advantage of not being unsightly, nor detracting from a scenic beach, nor disturbing shipping lanes, etc.

JP2014540551A 8 Nov. 2011 (2011 Nov. 8) discloses a generator that can be used to extract energy from waves in a body of water by converting wave energy into an electric energy. The generator comprises a movable float responding to the wave motion, a reaction member positioned below the float, bonding lines forming distance between the float and the reaction member. The generator is adaptable to the depth of water and the height of the reaction member from the bottom. The generator further includes a bonding wire mounted on the periphery of a drum with adjustable length.

The document fails to disclose an offshore floater system including a lever arm and floaters configured to be able to follow contours of a wave and to increase or decrease an effective length of the lever arm.

US 1997/6109029A (Alan Keith Vowles, Gerald John Vowles [US]) 29 Jan. 1997 (1997 Jan. 29) discloses an apparatus and method for converting the motion of waves on a body of fluid into useable lenergy. The apparatus employs a reciprocating wave follower tracking the rising and falling waves and interacting with a driven device such as a pump. The invention increases the work producing travel distance beyond the previous art.

The document fails to disclose an offshore floater system as described above.

U.S. Ser. No. 11/795,661 (Green Ocean Energy Ltd [US] 26 Jan. 2005 (2005 Jan. 26) discloses a method and an apparatus for energy generation from wave motion comprising at least one member moving by the waves, an energy transfer mechanism converting kinetic energy to potential energy by pressurization of a fluid.

The document fails to disclose an offshore floater system as described above.

U.S. Ser. No. 17/496,775 (Flh Energy Technology Ltd. [US] 13 Jan. 2021 (2021 Jan. 13) discloses a multi-axial energy conversion device including a main body and a plurality of permanent magnet generating assemblies each including at least one permanent magnet generator, an arm and a driving component. A rotor structure rotates or swings relative to a stator structure.

The document fails to disclose an adaptable system capable to conform its settings to an actual water level and wave parameters.

DISCLOSURE OF INVENTION

The aforementioned deficiencies are therefore solved by the features of claims 1 and 16. In the dependent claims advantageous developments of the offshore floater system according to the invention are given.

It is therefore the object of the present invention to propose an offshore floater system (OFS) for a wave electricity generator comprising one or more lever arms coupled with one or more floaters and rotatably coupled with a base member, the system can be characterised in that the floaters and/or the base member can be configured to follow contours of one or more waves.

A further object is to propose the OFS with the floaters configured to be able to increase or decrease an effective length of the lever arms according to wave parameters.

A further object is to propose the OFS further comprising at least one magnetic element.

A further object is to propose the OFS with the floaters differently sized.

A further object is to propose the OFS with the floaters and/or the base member having a defined form.

A further object is to propose the OFS installed off shore.

A further object is to propose the OFS with the base member being able to react on a water level change.

A further object is to propose the OFS with the base member rotatably mounted to be able to react on a wave direction.

A further object is to propose the OFS coupled with an electric energy generator.

A further object is to propose the OFS coupled with a homopolar generator.

A further object is to propose the OFS with the electric energy generator coupled with a defined electrocomponent.

A further object is to propose the OFS with the lever arms coupled with a defined mechanocomponent.

A further object is to propose the OFS providing data transmissions.

A further object is to propose the OFS provided in a defined computing system.

A further object is to propose the OFS provided in a modular system.

A further object is to propose an offshore floater method for generating wave electricity based on operating the proposed system.

The method can further comprise the step of regulating an effective length of the lever arm according to wave parameters.

Other and further objects will be explained hereinafter and will be particularly pointed out in the appended claims.

In a first aspect, the invention discloses an offshore floater system for a wave electricity generator.

In a second aspect, the invention discloses an offshore floater method for generating wave electricity.

BRIEF DESCRIPTION OF DRAWINGS

The invention will now be described by way of example. Only essential elements of the invention are schematically shown and not to scale to facilitate immediate understanding, emphasis being placed upon illustrating the principles of the invention.

FIG. 9b is a schematic side view of another position of the base member shown in FIG. 9a.

BEST MODE FOR CARRYING OUT THE INVENTION

Figure 1:
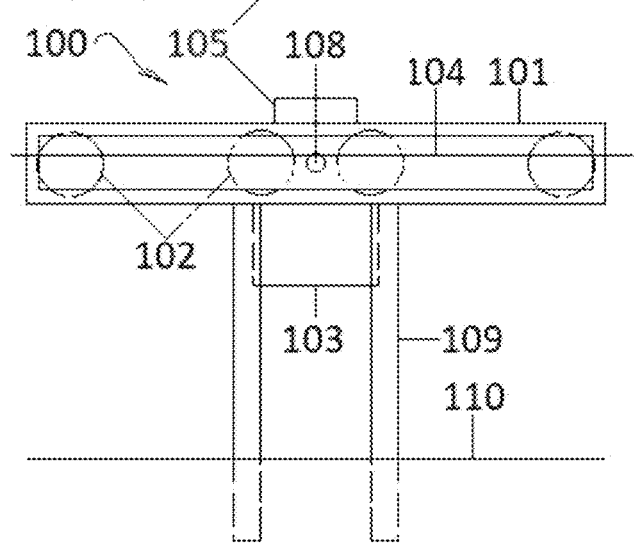
FIG. 1 is a schematic side view of an embodiment of an offshore floater system for a wave electricity generator (OFS) with a slidably anchored base member.

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. The detailed description is not intended to limit the principle of the presented invention, but only to show the possibilities of it.

The terms used in the claims and the specifications shall refer to their synonyms as well.

The term "to couple" and derivatives shall refer to a direct or indirect connection via another device, connection, element, and the like, the term shall refer to various types of coupling such as mechanical, hydraulic, pneumatic, electromagnetic, etc.

The term "to support" and derivatives shall refer to a direct or indirect supporting function via another device, structure, element, and the like.

As used in the claims and the specification, the term "base member" shall also refer to a base floater, a level adjustable floater, a level adjustable bottom rest supporting construction, a mass, a counterweight, a balancing weight, a pendulum, and the like.

As used in the claims and the specification, the terms "base member", "level adjustable base member" shall preferably not exclusively refer to an anchored floater wherein said anchoring may be selected from the group consisting of static anchoring (e.g. with anchoring lines, truss structures, various types of joints and couplings inclusive of ball-and-socket joints, various degrees of freedom joints, ballast tanks, gravity foundations at the seabed or mudline, structures buried in the sea floor, suction anchors, anchor-buoys, etc.; the anchoring can be permanent or temporary), dynamic anchoring (e.g. dynamic active or passive position keeping or changing systems which can be provided by the proposed system or by a coupled construction such as a boat, a drone, etc., the system can be moved into/away from its expected geographic position by various (un-manned) propulsion systems, may be driven by action of the waves, etc.), or combinations thereof, (the same applies to mooring, tethering, etc.) and shall further refer to any construction providing buoyancy and shall refer to passive buoyancy control systems and active buoyancy control systems wherein flotation may be obtained by various active devices (variable ballast tanks, compressed air, propellers, jets, etc.), shall refer to combined systems and shall refer to built-in, attached, detachably attached, etc., floaters in various configurations.

As used in the claims and the specification, the term "bottom rest supporting construction", "level adjustable bottom rest supporting construction" shall preferably not exclusively refer to a bottom rest supporting construction, wherein at least one said bottom rest supporting construction is selected from the group consisting of fixed constructions, compliant constructions, or combinations thereof.

As used in the claims and the specification, the term "level" as in "level adjustable base member", "level adjustable bottom rest supporting construction" shall preferably not exclusively refer to a level wherein at least one said level is selected from the group consisting of levels situated between above water level (the waterline) and a water bottom, or combinations thereof.

As used in the claims and the specification, the term "level adjustable", shall preferably not exclusively refer to mechanical (e.g. sliding constructions, slack-line configurations), hydraulical, electromagnetical, pneumatic constructions, servo systems, and shall refer to constructions powered manually, electrically, hydraulically, pneumatically, and shall refer to constructions powered by natural forces, e.g. buoyant force, gravitation force, etc., and shall refer to constructions controlled manually, computer controlled, remote controlled, natural phenomena controlled (e.g. controlled by tides, where consistent cyclic motions of water levels are known such as tides, a systematic timing device may be implemented to automatically rise and lower the system components such as a base member), etc.

As used in the claims and the specification, the terms "onshore power source", "offshore power source" shall refer to power transmission systems, power distribution systems and shall refer to mobile systems and shall refer to "power grid" and the like as well.

As used in the claims and the specification, the term "motor generator" shall preferably not exclusively refer to electric energy generating systems using an electrical generator coupled with an engine (which can be a jet engine, an engine burning a hydrocarbon fuel, a gas generator, a turbine, etc.) and shall also refer to the term "power plant", and the like, and shall also refer to pump-motors, mobile units, compact units, enclosed units, portable units, skid mounted units and shall also refer to thermal electric types and atomic types and shall also refer to floating and underwater types and shall also refer to power plants, power units comprising exhaust products (e.g. gases, fluids) treatments.

As used in the claims and the specification, the term "rechargeable power source" shall refer to rechargeable batteries, (super) capacitors, hybrid sources, energy storage elements, energy accumulators, (high-pressure) accumulator banks, and the like.

As used in the claims and the specification, the singular forms are intended to include the plural forms as well.

As used in the claims and the specification, "A/B" shall refer to A and/or B.

The terms "to comprise", "to include", "to contain" and derivatives specify the presence of an element, but do not preclude the presence or addition of one or more other elements or groups and combinations thereof.

The term "consisting of" characterises a Markush group which is by nature closed. Single members of the group are alternatively useable for the purpose of the invention. Therefore, a singular if used in the Markush group would indicate only one member of the group to be used. For that reason are the countable members listed in the plural. That means together with qualifying language after the group "or combinations thereof" that only one member of the Markush group can be chosen or any combination of the listed members in any numbers. In other words, although elements in the Markush groups may be described in the plural, the singular is contemplated as well. Furthermore, the phrase "at least one" preceding the Markush groups is to be interpreted that the group does not exclude one or more additional elements preceded by the phrase.

The invention will be described in reference to the accompanying drawings.

FIG. 1 is a schematic side view of an embodiment of an offshore floater system (100) for a wave electricity generator comprising a lever arm (101) [i.e. a rocker arm, a tilting arm, a moment arm, a swinging power-transmitting lever, etc., which can be from any convenient material such as metals, metal alloys, wood, polymers, molded reinforced or prestressed concrete, combinations, etc., the materials can be provided with a convenient anticorrosion protection including metal plating, painting, sacrificial anode cathodic protection (SACP), etc., and which can provide leverage action multiplying the buoyancy force; the lever arm can (at least partially) rotate about an axis (108) [in a clockwise or counter-clockwise direction] and can be coupled with bearings; the bearings can be conventional roller and ball bearings which can be coupled with a freewheel; the bearings for oscillating movement can be from rings and flexible material such as rubber material of various designs which can suitably provide cavities, the bearings with leaf springs can be used, the bearings can be made of alloys, carbon fiber material, etc.; swivel-couples, plain bearings, collars and sleeves can be used; other structures such as adjusting nylon washers with gasket can be mounted, etc.; the lever arm (101) can be subjected to various loads such as mass, buoyancy, impact of waves, etc.; the lever arm (101) can have various hydrodynamically, aerodynamically and mechanically convenient profiles, a sufficient mechanical strength, truss structures, open frameworks, braces, etc., can be used, blade profiles, sandwiched constructions, prestressed constructions, etc.; the proposed mechanism of the lever arm (101) can advantageously use the available wave energy of each wave in its upward and downward movement thus utilize the total of the wave energy at a certain area of an offshore installation; the lever arm (101) does not need to be too long which can be structurally and materially challenging in offshore conditions, it may have a typical wavelength, more wavelengths or a fraction of a wavelength and the system can still provide its full functionality because it cannot only adapt itself but can also follow the contours of the waves and become dynamically adjusted to actual waves' parameters] coupled with floaters (102) [which can have a defined form/e.g. spheres, spherical dishes, elliptical or oval cross-sections, disc shapes, pontoons, buoys, tapered forms, forms with a plurality (concave) depressions, blade profiles, airfoil respective hydrofoil profiles respective wings generating uplift or downward forces, hydrodynamic shapes such as square shapes with rounded edges, circular cross-section forms, convex faces, double convex faces, etc./and which can be from any convenient material such as plastic, polyethylene, high density polyethylene (HDPE), rigid polystyrene, polyvinyl chloride, can be comprised of hollow structures and can be filled with closed-cell expanded polyurethane, polystyrene foam, rigid foam, (balsa) wood, etc.; the floaters can be coated with glass fiber composites, carbon fiber composites, etc.; the floaters can be made of sandwiched layers performing different functions and having different structures such as a honeycomb structure, etc., wherein the electric output of the system can increase in proportion of the volume of the floaters (102) and the submerging inertia body; different volumes can be used for small electric output and large electric output; a floater buoyancy can be within a defined range to its dry weight to provide efficiency of the system/e.g. above 10 times its dry weight/; the floaters (102) can be semi-submerged or submerged at different depths of submergence according to specific demands on the system] and rotatably coupled with a base member (103) [which can be from similar materials, can be comprised of hollow forms, tanks, floating platforms, pontoons, etc.; the base member can provide or can be coupled with constructions and (preferably perfectly watertight) installation spaces, casings, housings, etc., which be used to install hydraulics, electronics, power and other systems]. The floaters (102) can be able to increase or decrease an effective length of the lever arm (101) [e.g. by rolling, sliding, shifting on, in, under, at about the lever arm construction (101); the proposed system can provide a translation of the floaters about the lever arm (101), the translation can be controllable by various means such as buoyancy of the floaters (102) or other active or passive systems and means which can be mechanical, hydraulic, electromagnetic, pneumatic, etc.] according to wave parameters (not shown). The offshore floater system (100) can be installed off shore and the base member (103) can be anchored to be able to react on a water level change [e.g. can be slidably coupled to a supporting construction (109) such as piers, rails, etc., anchored to the seabed (110) [which may be horizontal or slope] and provided high enough above the water level (104) [e.g. the crestline of the highest waves] to ensure that in storm conditions the system can be lifted from the sea; the system can make use of a buoyancy of the base member (103); the system can further comprise active or passive systems controlling the buoyancy, active coupling systems including motors, actuators, etc., sensing circuits to control, change, adjust, etc., the level of the base member (103) with respect to the wave floor for an optimal output of the system, or with respect to predetermined maximum settings/e.g. too high waves or wind velocity, too low air temperature, etc./, these control systems can be coupled with a remote controller, a cloud, a central controller, etc., with various local/distant wired/wireless communication techniques, the system can submerge/e.g. 5 to 20 meters/or lift from the sea the floater system (100) if needed, e.g. in case of an emergency to protect the system/e.g. a sea storm, a malevolent attack, freezing, the threat of a collision with a maritime transport, etc./, the components of the anchoring system can be further controllable, e.g. telescopic struts, slidably, rotatably mounted, etc.; the base member can be level adjustable by different means/e.g. mechanical, hydraulic, pneumatic, electromagnetic, etc./, the buoyancy and the mass of the base member can be controllable actively or passively, the base member can be coupled with a mechanism configured to introduce the base member into the waves, to position the base member at different levels; the positioning mechanism can for example force the base member (103) into the wave thus increasing vertical distance traveled by the floaters (102) and analogically can be forced the floaters (102); the proposed ability to react on the water level change can further provide a wave energy conversion device that can operate despite tidal variations]. The lever arm (101) can be coupled with an electric energy generator (105) [which can be an alternator, a dynamo, a homopolar generator, etc.] which can be coupled with an electrocomponent (not shown) [which can be provided in power, communication, signal, sensor circuits/e.g. which can be able to monitor at least wave amplitude and frequency, to measure the height of wave troughs and wave crests, etc.; load-monitoring devices, pressure transducers, pitot tubes, etc./, which can provide power components, communication components, controlling components, which can provide banks of components, distributed components, component arrays and which can be provided in one or multiple packing conformed to the offshore condition/e.g. water tight, insulated, etc./; the sensors can further monitor mechanical forces acting on the system components, hydrodynamic forces, wave impact forces, buoyancy forces, actuator pressing forces into the waves, energy output of the system, parameters of hydraulic and other system components, depth parameters, etc.; the sensors can be used to adjust adjustable mechanical components such as gears, reducers, multipliers, (one-way) clutches, freewheels, brakes, hydraulic cylinders, etc.; continuous wave phase control can optimize the wave energy harnessing efficiency; the sensor can be acoustic inclusive of echo sound systems, electromagnetic inclusive of a radar, mechanical inclusive of pressure transducers, optical inclusive of laser beams, etc.; the sensors can be placed on any component of the system, on surrounding structures and constructions, etc.; drones can be used as sensing aids]. The lever arm (101) can be coupled with a mechanocomponent (not shown) [which can convert a swinging movement into a rotational movement, which can transfer the rotational movement to the electric energy generator or generators, which can provide a shock absorbing function, relieve shock effects, etc.]. To obtain optimum component operational parameters such as proper lever arm length, proper floater and base member dimensions, the amount of leverage desired, etc., the mass-moments, the buoyancy forces, the known and expected wave, winds, undercurrents parameters, year-long seasonal variations, bathymetry data, etc., can be calculated. A balance between the floater, base member parameters and the lever arm length may be established to accommodate the design wave characteristics depending mainly on the wavelength and water depth [e.g. at steep coastlines the full wave capacities can be delivered in a different manner than at places further from the coastline]. Variations may naturally occur in wave height from one wave to the next, a naturally adaptable system of the lever arm's effective length can provide an increased effectivity of the power collecting.

The offshore system (100) can provide wired/wireless data transmissions in relation with electricity production, servicing, controlling, managing, etc. The data transmissions can be local [e.g. via communication interfaces, local wired/wireless networks] and distant [e.g. via offshore power and/or communication cables, satellite connections, telephone techniques, etc.]. The data transmissions can include underwater acoustic techniques. The OFS can use any type of communication interfaces, lines, techniques and protocols. The OFS can be provided in a modular system [each component of the system (100) can be modularly scalable and/or exchangeable].

The OFS coupled with a rechargeable power source and the system can comprise thermal management systems to thermally manage charging and/or discharging the rechargeable power source [e.g. the systems can thermally manage the chargers and/or charging interfaces and/or charging cables] using air tempering systems, liquid tempering systems, liquid tempering systems using offshore water as a thermal medium, systems pumping cold water from the sea depths and recirculating water to cooler depths for heat exchange purposes, pumping compressed air or other fluids, etc. The systems can comprise ventilators, thermal exchangers, oil/water heat exchangers/with a biodegradable non-toxic hydraulic oil/, compressors, chillers, condensers, heaters, sensors, pumps, programmable controllers, thermal medium conducts, valves, etc.

Similarly the wave electricity production components may need to be provided with a thermal management system [e.g. mechanocomponents such as gears, electrocomponents, electric energy generators, provided hydraulic or pneumatic systems, etc.].

The rechargeable power source (not shown) can be banks of rechargeable capacitors and/or batteries of various known types. The source management system (not shown) can manage charging and/or discharging the rechargeable power source [it can comprise various circuit topologies including electrocomponents such as converters, inverters, voltage regulators, power factor corrections, rectifiers, filters, controllers, processors, etc.]. A rectifier can be coupled to a voltage converter to generate a consistent DC current to be used as a final source of electricity or to be converted to an AC current and delivered to a power generation grid, may be accumulated on shore and delivered to a power distribution grid, etc. Programmable logic control devices may be incorporated into the system to control the generators, rechargeable power sources [e.g. the supercapacitors and batteries, etc.], and other components to deliver a consistent electrical current to the shore. Power generators may be arranged to generate electric power regardless of the direction a driveshaft rotates.

Figure 2:
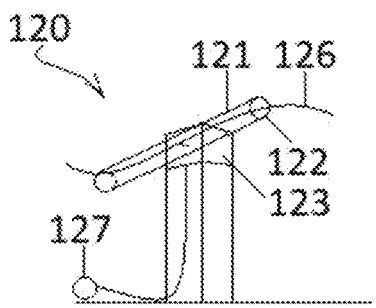
FIG. 2 is a schematic perspective illustration of another embodiment of an OFS coupled with an offshore distribution substation.

FIG. 2 is a schematic perspective illustration of another embodiment of an offshore floater system (120) for a wave electricity generator comprising a lever arm (121) coupled with floaters (122) and rotatably coupled with a base member (123). The floaters (122) can be able to increase or decrease an effective length of the lever arm (121) according to wave parameters (126) [which can be a wave height, width, depth/i.e. a zone wherein an influence from waves occurs under the water surface/, frequency, cadence, form, shape, volume, pitch, wave crest form, wave trough form, wavelength/e.g. 0.5-2 meters, 2-50 meters near the shore or in protected areas, up to 300 meters on the high seal, typical observed period for waves in an area, wave climates with annualized wave height averages, temperature and density conditions, the average significant wave height and the average wave period based on data from NOAA (National Oceanic and Atmospheric Administration), smaller-than-expected wave profiles, a wavelength expected at a specific site, an annual wave climate, bobbing motion, rocking movement, a type of surge, a type of (thermal, saline, etc.) undercurrents, a type of breaking waves, etc.]. The offshore floater system (120) can be installed off shore and the lever arm (121) can be coupled with an electric energy generator (not shown) [e.g. a conventional or variable-speed generator may be used, the generator may be powered using high pressure fluid or gas generated by a pump, a linear generator may be used using the oscillating motion, other lever arms may be used to leverage the reciprocating motion, wherein the mechanical advantage can be reversed where torque is traded for longer strokes in the reciprocating system; less moving parts can represent less energy losses through friction and inertia between components] which can be coupled with an electrocomponent (127) [which can be an offshore distribution (smart) substation, etc.].

As far as the wave energy dispensible in an offshore installation concerned, for example, one lineal mile of ocean wave front with eight foot crest to trough waves and with a period of ten seconds can have one hundred eighty seven megawatts of power available. Waves in both shallow and intermediate depth water near the shore contain the same amount of energy as those in deep ocean water if the wave height and period are the same. Materials and construction costs may be less if the energy extraction system may be located near the shore [e.g. 500 feet off shore, up to 3000 feet off shore, etc.]. The electricity generated by the system may be transmitted by cable to a power distribution center or transmitted to an electric motor or other device.

Figure 3:
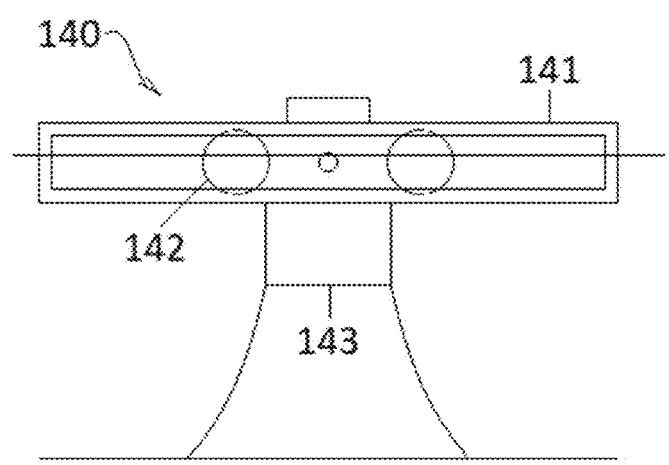
FIG. 3 is a schematic side view of another embodiment of an OFS with a base member anchored with anchoring lines.

FIG. 3 is a schematic side view of another embodiment of an offshore floater system (140) for a wave electricity generator comprising a lever arm (141) coupled with floaters (142) and rotatably coupled with a base member (143) [which can be anchored with anchoring lines which can be chain lines, wire lines, synthetic fiber ropes/e.g. Nylon, Polyester, Sisal, Polypropylene, etc./, e.g. in a tout-line anchorage system, etc., and which can be configured to provide an adequate buoyancy and stability/e.g. by means of stabilizing fins, bilge keels, protrusions, or other structures which can be provided to keep balance/].

Figure 4:
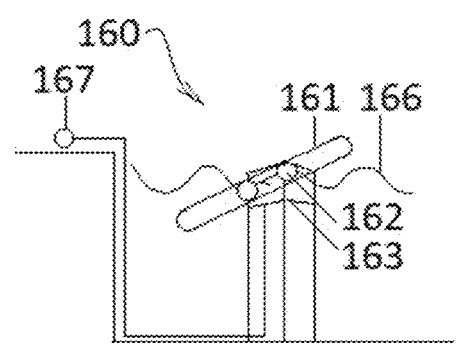
FIG. 4 is a schematic perspective illustration of another embodiment of an OFS coupled with an onshore distribution substation.

FIG. 4 is a schematic perspective illustration of another embodiment of an offshore floater system (160) for a wave electricity generator comprising a lever arm (161) coupled with floaters (162) and rotatably coupled with a base member (163). The floaters (162) can be able to increase or decrease an effective length of the lever arm (161) according to wave parameters (166). The offshore floater system (160) can be installed off shore and the lever arm (161) can be coupled with an electric energy generator (not shown) which can be coupled with an electrocomponent (167) [which can be an onshore distribution (smart) substation, etc.].

Figure 5:
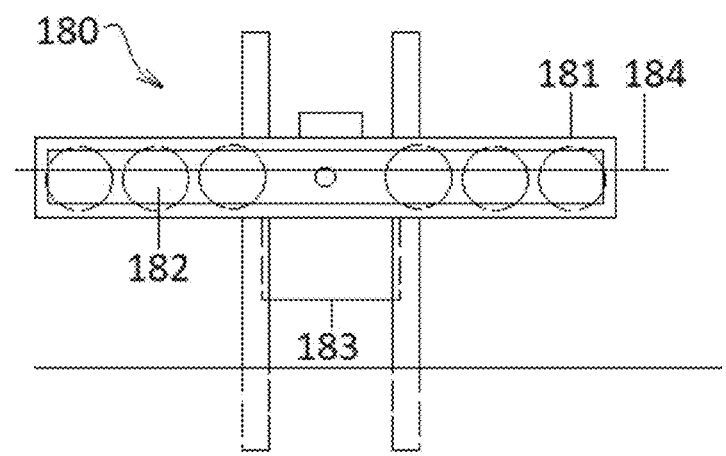
FIG. 5 is a schematic side view of an embodiment of an OFS with a plurality of floaters and a slidably anchored base member.

FIG. 5 is a schematic side view of another embodiment of an offshore floater system (180) for a wave electricity generator comprising a lever arm (181) coupled with floaters (182) and rotatably coupled with a base member (183) which can be anchored to be able to react on a water level (184) change so that the floaters (182) and the base member (183) can at least partially or at least substantially follow contours of a wave (not shown). The elements of the invention can be preferably designed to allow shoaling to continue without causing the waves to break because breaking waves lose a large percentage of their energy to turbulent mixing, which reduces the energy available to the system. Waves created by wind moving offer the surface form a vertical pressure front transported through the water masses in a horizontal direction, the pressure front can be equivalent to the amplitude of an incident wave, the stored wind's energy depends on the wind velocity and the length of time and the distance over which the wind is blowing which determines wave height and length. The wave length becomes shorter as the water decreases in depth. The total amount of energy stored in the water is composed of kinetic (associated with the water movement, i.e., mass and velocity) and potential (associated with the ability of a mass of water to fall a distance due to gravity). If the wave meets an obstacle it can be reflected and/or refracted. The wave can pass over the obstacle principally unaffected. The positioning of a moving object [such as the floater (182) and the base member (183)] close to the surface can result in the mass set in motion by the passing wave which can activate an energy collecting and converting mechanism such as the proposed offshore floater system-a hydraulic pressure building system-a hydraulic motor-an electric energy generator, etc. The proposed system can be further optionally equipped with streaming devices such as side walls, barriers, chokes, panels, funnels, movable elements, etc., to concentrate the wave energy travelling through the pressure fronts. The barriers can be bottom fixed constructions or floating bodies.

Figure 6:
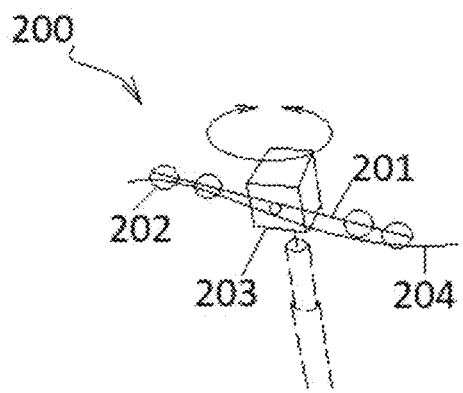
FIG. 6 is a schematic perspective illustration of another embodiment of an OFS rotatably mounted to be able to react on a wave direction.

FIG. 6 is a schematic perspective illustration of another embodiment of an offshore floater system (200) for a wave electricity generator comprising a lever arm (201) coupled with floaters (202) and rotatably coupled with a base member (203) which can be anchored to be able to react on a water level (204) change and rotatably mounted to be able to react on a wave direction (to yaw in response to incident waves) and/or to work with the wind [e.g. mounted on a telescopic strut and various control system can be used from manual to fully automatic systems; in small seas, power capture can be maximised by orienting the system at an angle to the incident waves, in extreme seas the system can be oriented towards the incident waves], thus more power can be developed, sideloads can be avoided and a damage from working at crosswind conditions can be reduced. Where wave and wind patterns tend to be consistent a programmable device can control the orientation of the system, in case of inconsistent patterns various wind/water parameters sensors can be employed. A (temporal) relocation of the system can further enhance its productivity.

Figure 7:
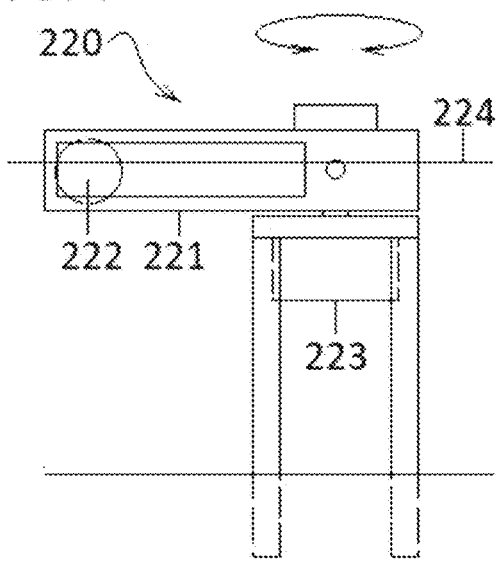
FIG. 7 is a schematic side view of another embodiment of an OFS comprising an unilateral lever arm and rotatably mounted.

FIG. 7 is a schematic side view of another embodiment of an offshore floater system (220) for a wave electricity generator comprising an unilateral lever arm (221) coupled with a floater (222) and rotatably coupled with a base member (223) which can be anchored to be able to react on a water level (224) change and rotatably mounted to be able to react on a wave direction [e.g. mounted on bearings arranged to remove radial and axial forces, the bearings can be prestressed and substantially free of looseness; the bearings can include inner and outer rings; flexible materials can be included in bearing systems; spring systems can be included; the bearings can be suitably spaced on a (central) axis to withstand impact of waves and to provide a desired stability]. The lever arm (221) can be optionally coupled with a spring (not shown) with a spring constant to force the arm (221) into the return movement.

Figure 8:
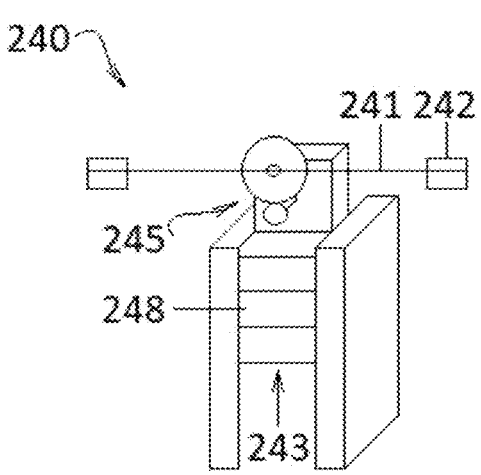
FIG. 8 is a schematic perspective illustration of another embodiment of an OFS comprising a geared lever arm and further comprising a magnetic element.

FIG. 8 is a schematic perspective illustration of another embodiment of an offshore floater system (240) for a wave electricity generator comprising a lever arm (241) coupled with floaters (242) and rotatably coupled [e.g. via gears (245) wherein various systems of large and small gears, planetary gears, etc., can be provided; all kinds of gears can be utilized/e.g. spur, helical, double helical, herringbone, bevel, worm, hypoid, etc./; gears or a gearbox may increase the rotation speed to provide a higher and more efficient rotation speed for a generator which can be located in any position to the gears (245)] with a base member (243) which can be anchored to be able to react on a water level (not shown) change. The OFC can further comprise a magnetic element (248) [which can be one or more permanent magnets, magnetized buoyancy blocks, electromagnets or combinations] being in a magnetic relation with at least one component of the OFC [e.g. the magnetic elements (248) can be provided in, on, attached, coupled, etc. with a base member (243) and an anchoring system can comprise magnetically coupling coils or other magnetic elements (not shown) relative movement between the magnetic elements (248) can produce electricity which can be used together with the electricity produced by an electric energy generator (not shown) coupled with the lever arms].

Figure 9A:
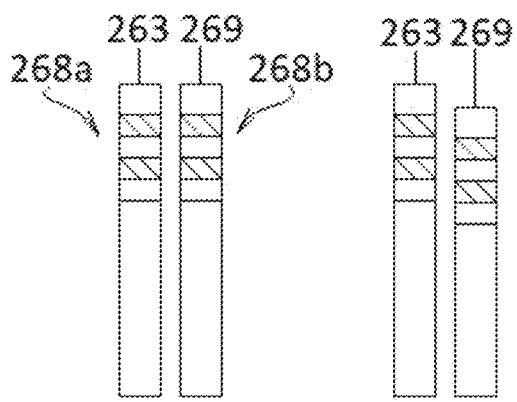
FIG. 9a is a schematic side view of one position of a base member comprising magnetic elements.

FIG. 9a is a schematic side view of one position of a base member (263) and an anchoring system (269) which can comprise magnetic elements (268a, 268b) [which can be permanent magnets, magnetic materials, electromagnets, coupling coils, coils with cores, with backing plates, etc., magnetically coupling coils or other magnetic elements (not shown)] wherein a relative movement between the magnetic elements (268a and 268b) can produce electricity. [As known in the art the electromotive force (emf) may be calculated from a flux density, a conductor coil length and a velocity of the relative movement. The coils can be connected in series to increase the output voltage and can be connected with other electrocomponents such as capacitors, rectifiers, invertors, comparators, etc. The electromagnets can be W-shaped, double U-shaped, I-shaped, E-shaped, etc.]

Figure 9B:
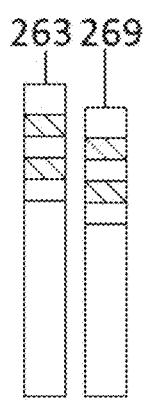

FIG. 9b is a schematic side view of another position of the base member (263) and the anchoring system (269) as shown in FIG. 9a.

Figure 10:
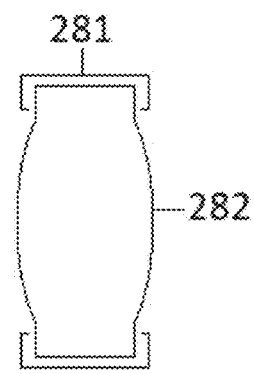
FIG. 10 is a schematic cross sectional view of a lever arm coupled with a disc type floater.

FIG. 10 is a schematic cross sectional view of a lever arm (281) coupled with a floater (282) [which can have double convex faces] which can be used in the proposed system.

Figure 11:
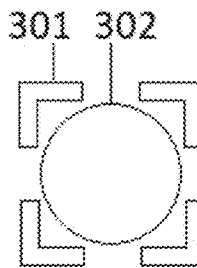
FIG. 11 is a schematic cross sectional view of a lever arm coupled with a sphere type floater.

FIG. 11 is a schematic cross sectional view of a lever arm (301) coupled with a floater (302) [which can have be a sphere] which can be used in the proposed system.

Figure 12:
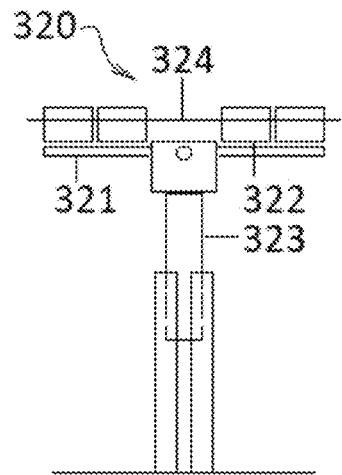
FIG. 12 is a schematic side view of another embodiment of a rotatably mounted OFS.

FIG. 12 is a schematic side view of another embodiment of an offshore floater system (320) for a wave electricity generator comprising a lever arm (321) coupled with floaters (322) and rotatably coupled with a base member (323) which can be anchored to be able to react on a water level (324) change and rotatably mounted to be able to react on a wave direction [e.g. mounted on an axle, a pivot, a pole, a shaft, a spindle, a turning point, etc.].

Figure 13:
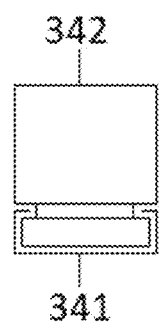
FIG. 13 is a schematic cross sectional view of a lever arm coupled with an upper sliding quadratic floater.

FIG. 13 is a schematic cross sectional view of a lever arm (341) coupled with a floater (342) [which can be a polyhedron/e.g. a cube/] which can be used in the proposed system.

Figure 14:
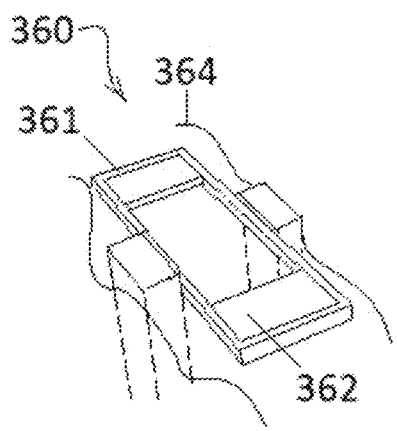
FIG. 14 is a schematic perspective view of another embodiment of an OFS with panel type floaters.

FIG. 14 is a schematic perspective view of another embodiment of an offshore floater system (360) for a wave electricity generator comprising a lever arm (361) coupled with floaters (362) [which can be cuboids, desks, plates, wave-energy absorbing panels, sandwiched constructions, constructions enabling throughflow, etc.] and coupled with base members (362) [the floaters (362) can function as base members] which can be anchored to be able to react on a water level (364) change [e.g. slidably coupled].

Figure 15:
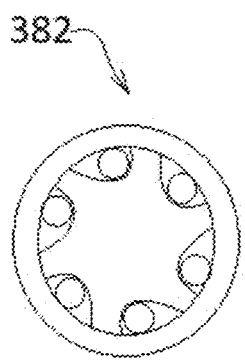
FIG. 15 is a schematic side view of a mechanical freewheel.

FIG. 15 is a schematic side view of a freewheel (382) which can be coupled with a lever arm of the invention [any type of a freewheel can be used instead, e.g. comprising springpressed balls wedged between tapered surfaces of a gear ring and a disc, etc.] and which can be coupled with other mechanocomponents and components such as shafts, gears, electric energy generators, etc., and which can convert a swinging movement of the lever arm into a rotational movement whose parameters can be further modified, e.g. by gears, etc.

Figure 16:
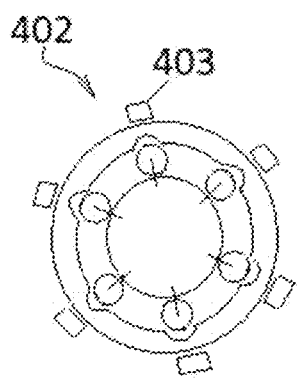
FIG. 16 is a schematic side view of an electromagnetic freewheel.

FIG. 16 is a schematic side view of an electromagnetic freewheel (402) which can consist of a mechanical part and an electromagnetical part which can include magnetic elements [e.g. electromagnets (403)] which can be locally/distantly, automatically, mechanically, electromagnetically, electrically, electronically controlled to provide a selected functionality, wherein the freewheel can function for both rotational senses; electromagnetically can be controlled roller freewheels, sprag freewheels, ratchets and pawls, etc. Similarly clutches can be used which can be controlled mechanically, electrically, electronically, electromagnetically, hydraulically, etc. Various types of clutches can be used such as conical, disc, sprag, overrunning, etc. Various clutch-freewheel couplings can be used. The controllable freewheels, clutches, gear locking mechanisms, etc., couplings can conveniently stop the operation of the system [e.g. during repairs, during a storm, while the system lifted from the sea, while a smaller number of electric energy generators should be operated as the waves diminish, etc.].

Figure 17:
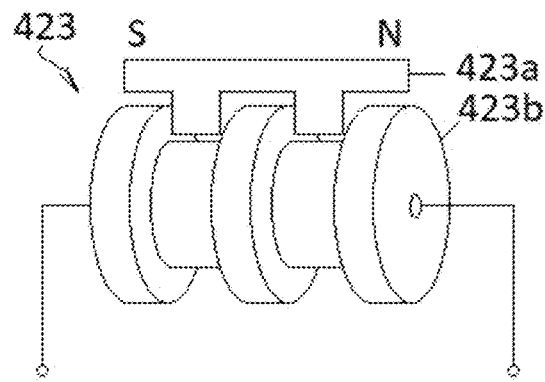
FIG. 17 is a schematic oblique view of a homopolar generator.

FIG. 17 is a schematic oblique view of a homopolar generator (423) which can be coupled with lever arms of the proposed system (not shown). The homopolar generator (423) can be composed of a stator (423a) and a rotor (423b). The stator (423a) can be composed of a permanent magnet or an electromagnet which can have various forms, e.g. cylindrical, segmental, sectional, etc. The rotor can be composed of a magnetic conductor which can be provided with electrically conductive surface layer or can be composed of electrical conductors [e.g. in a composed form of conductive drums and discs]. The rotor can be coupled with conductive bearings and with other electrocomponents of the power production and distribution system. Other homopolar generator types can be used [e.g. disc types, drum types, combined types, coupled types, etc.]. Advantageously can be used types collecting electric energy by means of conductive bearings, but also types collecting electric energy by means of peripheral contacts because the system can be geared so that the homopolar generator can turn relatively slowly so that the peripheral collecting can be efficace. Systems employing freewheels, clutches or other analogous devices and homopolar generators can provide substantially constant energy output over time and reduce the need for a frequency converter.

Figure 18:
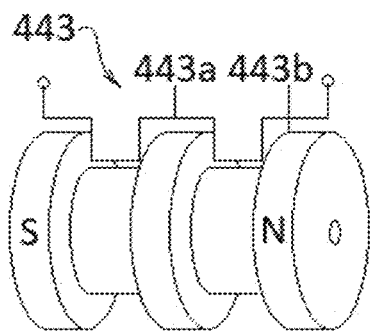
FIG. 18 is a schematic oblique view of a variant of a homopolar generator shown in FIG. 17.

FIG. 18 is a schematic oblique view of a variant of a homopolar generator (443) as shown in FIG. 17 wherein a stator (443a) can be composed of a magnetic conductor and a rotor (443b) can be composed of a permanent magnet or electromagnet. Similarly as shown in FIG. 17 the stator can have cylindrical or segmental forms. Different variants of the generators shown in FIGS. 17 and 18 can be provided proposing various winding, collector, electromagnet arrangements and combinations.

Figure 19:
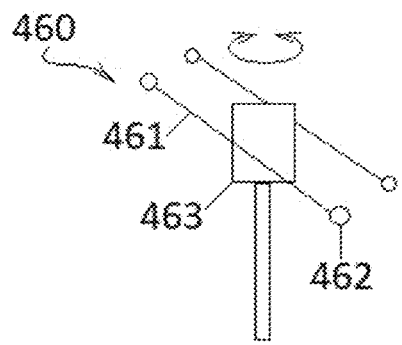
FIG. 19 is a schematic perspective illustration of another embodiment of an OFS comprising two lever arms.

FIG. 19 is a schematic perspective illustration of another embodiment of an offshore floater system (460) for a wave electricity generator comprising lever arms (461) coupled with floaters (462) and rotatably coupled with a base member (463) which can be anchored to be able to react on a water level (not shown) change and rotatably mounted to be able to react on a wave direction.

Figure 20:
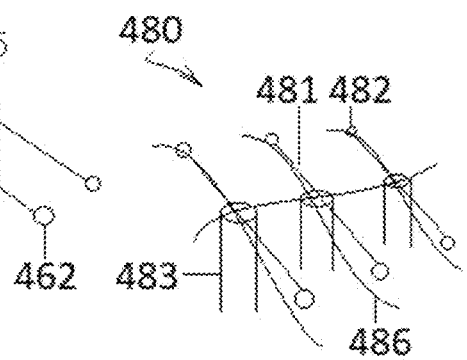
FIG. 20 is a schematic perspective illustration of another embodiment of an OFS with flexibly coupled base members.

FIG. 20 is a schematic perspective illustration of another embodiment of an offshore floater system (480) for a wave electricity generator comprising lever arms (481) coupled with floaters (482) and rotatably coupled with base members (483) [e.g. by meaning of a freewheel, a clutch so that different rotational speeds and swinging phases can be compensed] which can be anchored to be able to react on a water level change. The base members (483) can be flexibly coupled [e.g. by means of homokinetic joints, flexible shafts, shaft segments, etc.] so that the system can provide its functionality in a real offshore environment with three dimensionally formed waves (486).

Figure 21:
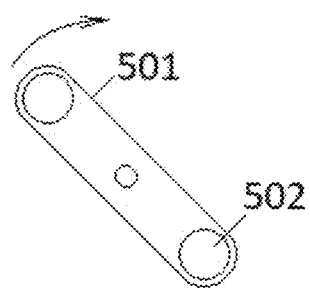
FIG. 21 is a schematic side view of a rotatable lever arm for an OFS.

FIG. 21 is a schematic side view of a lever arm (501) coupled with floaters (502) which can be used in the proposed system. The illustration shows a possibility of the proposed system to overturn [e.g. in case of a sudden squall, a wave, etc.] and still to maintain the functionality of the system. This feature means that the system is apt to be installed in a real harsh environment of seas. When a force towards the components exceeds a predefined limit a release mechanism can be provided to allow the lever arm (501) to rotate freely so that the forces of the strong waves cannot damage the construction [which can solve e.g. a hundert year wave problem].

Figure 22:
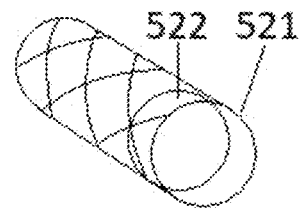
FIG. 22 is a schematic perspective illustration with a partial cutout of a cylindric lever arm and a ball type floater.

FIG. 22 is a schematic perspective illustration with a partial cutout of a lever arm (521) coupled with a floater (522) which can be used in the proposed system. The illustration shows that forms and shapes of lever arms and floaters can conveniently correspond and it further shows, that the construction of an arm can make possible for the water to flow in and flow out [e.g. by means of convenient openings, valves, nets, truss, etc.], overflow, etc. A form of the arm can be designed so that it represents a necessary lever mean but forms and obstacle to the wave to the smallest possible extent.

Figure 23:
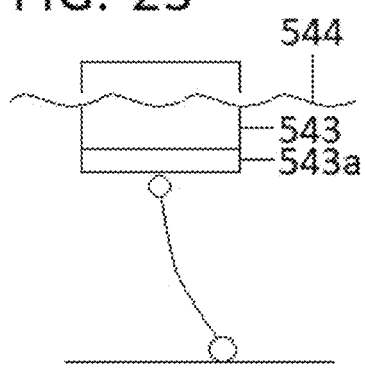
FIG. 23 is a schematic side view of an OFS comprising a base member with a ballast zone.

FIG. 23 is a schematic side view of a base member (543) which can be anchored to be able to react on a water level (544) change and rotatably mounted to be able to react on a wave direction. The base member (543) can contain various means to stabilize its position in relation to a lever arm (not shown) so that the swinging movement could be maximized. Various means can be employed [e.g. anchoring system, creating ballast zones (543*a*)/e.g. with ballast provided at or towards a lower end such that the center of gravity can be closer to the lower end and the center of buoyancy closer to the upper end/, suitably designed shapes and forms of the floaters (543) so that they can remain stable in an upright position, etc.]. The illustration also shows, that natural servos systems can be used to establish a relatively stable position of the base member (543) such as hollow buoyancy zones, ballast zones creating restoring torques to the vertical, a larger torque can be provided by more stable constructions such as embedded piers, rails, etc.

Figure 24:
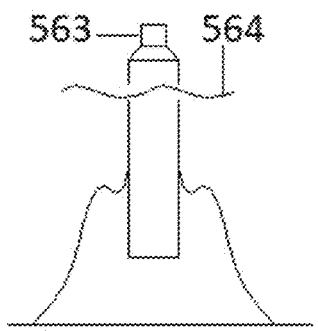
FIG. 24 is a schematic side view of a base member anchored by means of a slack anchoring line configuration.

FIG. 24 is a schematic side view of a base member (563) which can be anchored to be able to react on a water level (564) [e.g. by means of a slack anchoring line configuration which can include sinker weights, anchors attaching to the seabed, etc.]. The illustration shows a convenient form of the base member (563) which can provide a required stability of the system and which can be various types of spars [e.g. classic, truss, cell spars, etc., from various materials such as metals, metal alloys, concrete, polymers, etc.], heave surge reaction plates, thrust fins, spar buoys which can further include upper parts, connecting shafts, lower parts, etc.; the anchoring components can provide self-furling feature to roll with the punches of extreme waves so that the system can be preserved from a damage rendering it inoperable; the anchoring means can minimize and/or optimize an undue vertical movement due to harmonic movement of the water below normal wave action depth. The different parts can have various forms [e.g. disc, bulb bulbous, dome, inverse dome, etc.] to attain a maximum stability in water and to minimize deviations from an upright position. All the system components, especially the spar buoys and the floaters can be designed to minimize the drag from the waves.

Figure 25:
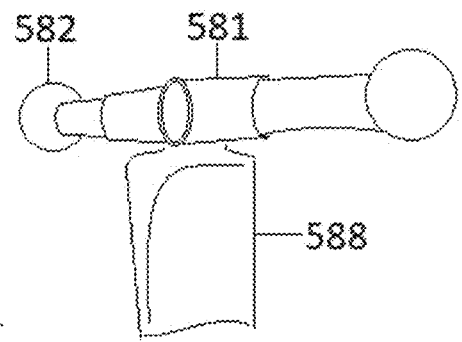
FIG. 25 is a schematic perspective illustration of a telescopic lever arm with an underwater sail for an OFS.

FIG. 25 is a schematic perspective illustration of a lever arm (581) [which can be a conveniently hydrodynamically designed telescopically adjustable (or sliding) arm which can be controlled by various means such as natural control by wave forms, telemetrically controlled to adjust the output of the system e.g. according to weather conditions, waves' progress and parameters, etc.] coupled with floaters (582) [which can be hollow or foam balls] which can be used in the proposed system. A timed periodic adjustment device may be used to accommodate changes in the waves parameters. [Various other length adjustment mechanisms can be used such as mechanical/connecting rods, pulleys, sliding mechanisms, guides, spring loaded mechanisms to restore an original position, rolling/unrolling, folding/unfolding, rotating mechanisms, etc./, hydraulic, pneumatic/such as cylinders and pistons/, electromagnetic/such as solenoids/, etc., the arms (581) can include various conduits, installations spaces, hermetically sealed spaces, watertight spaces, thermally managed spaces, etc.]. The lever arm (581) can be advantageously coupled with one or more underwater sail components (588) [which can be supported in the water in a manner such that it will be moved back and forth in an oscillatory manner by the movement of the water beneath the waves. It can be of rigid or flexible sheet type, it can be optionally constructed as to change its profile with each reversal of the direction of water movement. It can improve overall efficiency of the system. Various additional underwater sail sheets can be added in e.g. side-by-side relation. The underwater sails can be reefable, foldable, extendable, regulable, rotatably mounted to orient the apparatus, etc. The sails can be horizontally or vertically rotatably mounted. Special supporting constructions such as vertical anchored posts, frames, etc., can be added wherein the lever arm (581) can be coupled by various means such as connecting rods with the vertically rotated underwater sails, etc., or the underwater sails and the proposed offshore floater system can be coupled with a shaft, a gear, a rack, an electric energy generator, etc. Secondary underwater sail concept can be further used which interact with the underwater sail components (588) in a manner to capture energy on a leeward side. Other structures as breakwater reflecting the energy seaward can be used. The breakwaters creates standing waves which are different from travelling waves. The breakwaters and other reflecting devices, if phased properly (e.g. approximately at a distance L/2, the separation can be changeable), can reflect energy and increase the power output of the proposed system. The reflectors can be driven by motors in pivotal (or rectilinear) motion according to for example transducer signals processed through computer [e.g. amplified, attenuated, phased, etc.].

Figure 26:
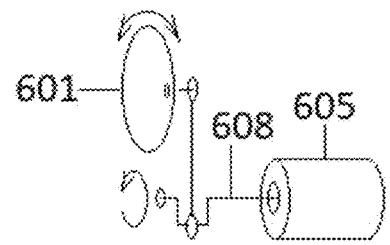
FIG. 26 is a schematic oblique illustration of a lever arm coupled via a crankshaft with an electric energy generator.

FIG. 26 is a schematic oblique illustration showing possibility of a lever arm (601) [only a central part shown] to be coupled with a crankshaft (608) which can be coupled with an electric energy generator (605). The shown arrangement can advantageously convert a swinging movement of the arm (601) into a rotational one of the shaft (608) and the generator (605). [Similarly the lever arm (601) can be coupled with other mechanocomponents such as energy transfer mechanisms comprising fluid or gas compressors and storage elements such as containers, tanks, expandable bladders filled with an inert gas, such as nitrogen, etc., and converting the kinetic energy into potential energy, storing the potential energy and further converting the potential energy into electrical energy. Various mechanocomponents can be housed within one or multiple bodies.]

Figure 27:
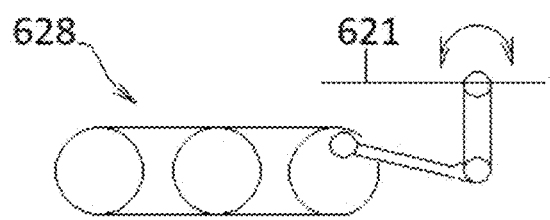
FIG. 27 is a schematic side view of a lever arm coupled with mechanocomponents.

FIG. 27 is a schematic side view showing possibility of a lever arm (621) which can be coupled with mechanocomponents (628) [e.g. an arm, a connecting rod, a flywheel, a cheek, a crank web, a belt, a chain, a joint, a cardan, a shaft, a sprocket, a cog wheel, etc.] and with electric energy generators (not shown) [which can be coupled in parallel, in series, in tandem, in arrays, etc., to individual mechanocomponents]. The shown arrangement can convert a swinging movement of the arm (621) into a rotational one.

Figure 28:
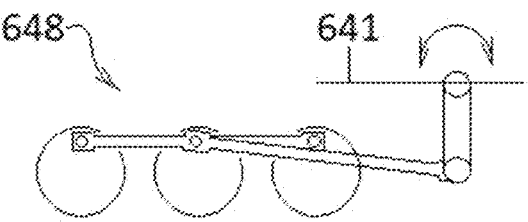
FIG. 28 is a schematic side view of a lever arm coupled with a transmission system.

FIG. 28 is a schematic side view showing possibility of a lever arm (641) which can be coupled with mechanocomponents (648) [e.g. a transmission system which can be similar to steam locomotives and far more elaborated than as shown, etc.] which can be provided in a casing (not shown).

Figure 29:
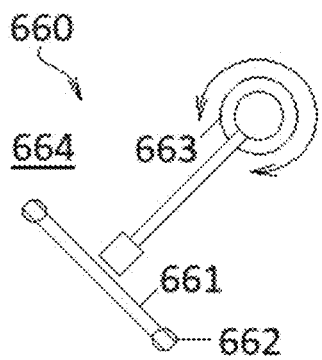
FIG. 29 is a schematic plan view of another embodiment of a rotatably mounted OFS installed off shore.

FIG. 29 is a schematic plan view of another embodiment of an offshore floater system (660) for a wave electricity generator comprising a lever arm (661) coupled with floaters (662) and rotatably coupled with a base member (663) which can be installed in an offshore water (664) and rotatably mounted to be able to react on a wave direction [e.g. mounted on a suitable thrust bearing system].

Figure 30:
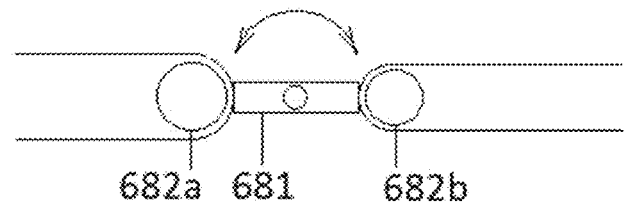
FIG. 30 is a side view of a lever arm with releasable and different sized floaters.

FIG. 30 is a side view of a lever arm (681) coupled with floaters (682a, 682b) which can be used in the proposed system. The illustration shows that embodiment of the invention can be provided with releasable floaters which can be released in case of extreme weather conditions off shore so that the system can be protected from strong impacts of waves. [Similarly elements of the system can be designed to fail in a benign manner to protect the integrity of the system in extreme conditions.] The floaters (682) can be for example simple inflated balls the price of which can be inferior to the price of other system components, mainly mechanical and power components. Thus, it can be advantageous to configure the system to be able to reduce hydrodynamical system load. The released floaters (682) can be attached by ropes, traceable by GPS or other antenna systems, etc. Similarly inflatable/deflatable floaters, airway lines, buoyancy controllers, pressure members such as compressors and valves, etc., can be used. The system can be alternatively protected and/or optimized by flooding a base member and the floaters (682a, 682b) so that the system can sink to a lower limit, the inner spaces can be watertight sealed for this event [the system components can for this purpose comprise load release and re-establish means such as inlets, outlets, vents, valves, pressure sensing switches, solenoids, release pins or cams, active/passive systems, etc.]. When monitoring system determines an improvement in the marine environment and the waves conditions, water can be displaced from the base member and the floaters (682a, 682b) by various means such as compressors, by means of pressurised air or liquid reservoirs, etc.]. The illustration further shows that the floaters (682a, 682b) can be differently sized. The system can be programmed to enter a storm survival mode wherein the energy transfer mechanism can be for example locked. Similarly a control system can shut the energy transfer mechanism in calm conditions when the wave energy is not able to run an electric energy generator. The base member and the floaters (682a, 682b) can further have adjustable buoyancy and adjustable mass; they can be provided in multiple buoyancy modes [e.g. subsurface, above the surface modes, etc.]. The adjustable buoyancy can control the energy capture in according to wave parameters such as wave size and wave period. The floaters (682a, 682b) can have inertia, drag and buoyancy components designed for particular applications to maximize the energy capture. They can have various forms [e.g. with a large surface area perpendicular to the direction of the undulating force to create a large drag and increased mass, etc., to capture the wave energy which is greatest at the water surface and decreases with the depth which can be used to optimalize the energy capture according to wave parameters/ e.g. to lower the energy capture in case of storm-waves/]. The lever arm (681) can be configured to sustain the loads transferred from the floaters (682a, 682b) to other energy capturing components inclusive of slamming loads in extreme waves, etc. [e.g. to a hydraulic motor with a pressure modulator and high and low pressure accumulators to smoothly rotate an electric energy generator; hydraulic systems can further include components such as (shared) hydraulic conduits, pumps of various types inclusive of reciprocating piston pumps, double acting pumps, etc., valves, actuators, hydraulic storage tanks, variable capacity hydraulic machines, spike suppression devices, control circuits keeping revolutions essentially constant to generate alternating current with or without a frequency converter; various types of hydraulic motors or the like can be employed such as gear, piston, vane, motors having variable displacement volume per revolution, etc.; various motor coupling can be used/e.g. in parallel, to the same shaft, etc./; by means of various hydraulic systems the wave energy can be converted into hydraulic energy which can be stored and/or converted into electric energy; analogically pneumatic motors and systems can be provided to convert and/or store the wave energy].

Figure 31:
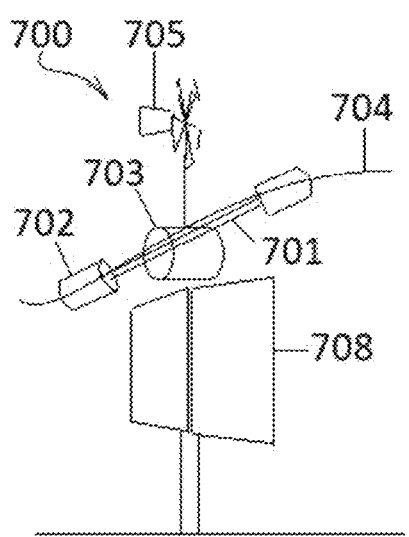
FIG. 31 is a schematic perspective illustration of another embodiment of an OFS rotatably mounted to be able to react on a wave direction and coupled with a wind energy system.

FIG. 31 is a schematic perspective illustration of another embodiment of an offshore floater system (700) for a wave electricity generator comprising a lever arm (701) coupled with floaters (702) and rotatably coupled with a base member (703) which can be anchored to be able to react on a water level (704) change and rotatably mounted to be able to react on a wave direction [e.g. mounted with directional means (708) such as (expandable) fins, keels, rudders, propellers, funnels, etc., which can rotate the floater (703) to the appropriate position; various systems of dynamic anchoring and position keeping can be used to keep the system in position, to move the system and/or to orient the system relative to the wavefront, etc.; various outrigger reactor means such as floaters can be used to overcome the effects of local winds and currents and to keep the system at a desired angle to incident waves]. The lever arm (701) can be coupled with an electric energy generator (not shown) which can be coupled with a wind energy system (705) [e.g. can form an offshore power production unit with power electronics and control and coupled via an offshore power cable with an onshore load, an offshore charging station, etc.]. Similarly above-water structures such as vertical (airfoil-) sails, blades, rudders, etc. can be used to orient the system.

Figure 32:
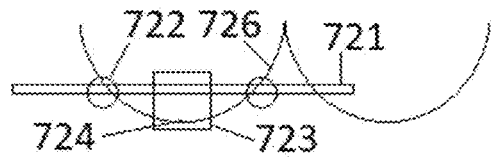
FIGS. 32 to 34 are functional schematic illustrations of another embodiment of an OFS showing various phases and positions of the system relative to the advancing wave.
Figure 33:
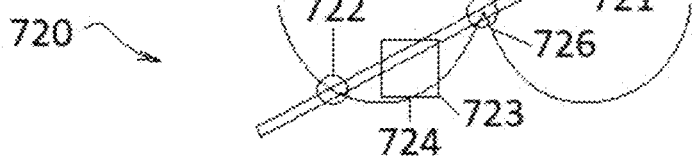
Figure 34:
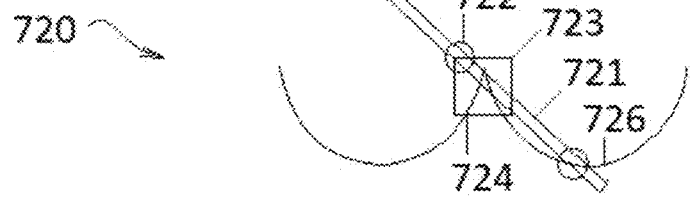

FIGS. 32 to 34 are functional schematic illustrations of another embodiment of an offshore floater system (720) for a wave electricity generator comprising a lever arm (721) coupled with floaters (722) configured to be able to increase or decrease an effective length of the lever arm (721) rotatably coupled with a base member (723) which can be anchored to be able to react on a water level (724) change. The figures show various phases and positions of the system relative to the advancing wave (726).

Figure 35:
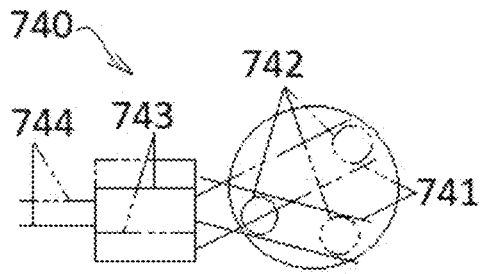
FIG. 35 is a functional schematic illustration of the working principle of an OFS.

FIG. 35 is a functional schematic illustration of another embodiment of an offshore floater system (740) for a wave electricity generator comprising a lever arm (741) coupled with a floater (742) and rotatably coupled with a base member (743) which can be anchored to be able to react on a water level (744) change. The figures show the working principle of the proposed system with waves's cyclic movement and the base member (743) with the floaters (742) being able to react on it and swing the lever arm (741). The proposed system can employ the horizontal and the vertical vector elements of wave motion energy which can be transmitted by the force of viscosity between water particles.

Figure 36:
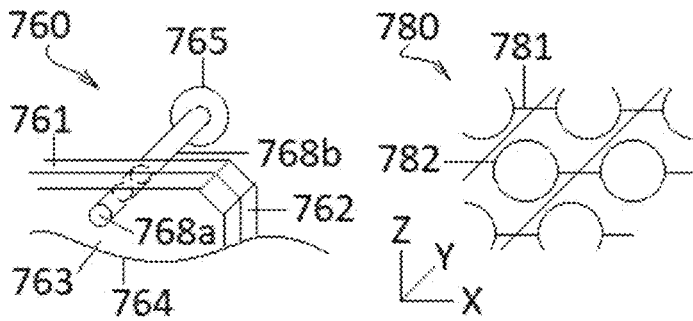
FIG. 36 is a partial schematic oblique view of axially coupled lever arms in an OFS.

FIG. 36 is a partial schematic oblique view of another embodiment of an offshore floater system (760) for a wave electricity generator comprising lever arms (761) coupled with floaters (762) and rotatably coupled with one or more base members (763) by means of a mechanocomponent (768a) [e.g. a freewheel, a clutch so that different rotational speeds and swinging phases can be compensed for a shaft (768b) which can be coupled with another mechanocomponent such as gears and/or with an electric energy generator (765)/e.g. a homopolar generator/]. The base member (763) can be anchored to be able to react on a water level (764) change.

Figure 37:
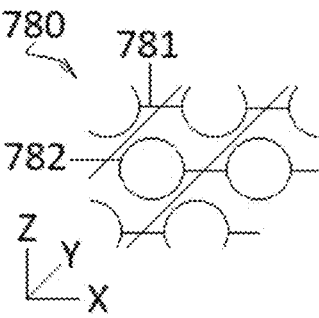
FIG. 37 is a partial schematic oblique view of an array of axially and radially coupled lever arms in an OFS.

FIG. 37 is a partial schematic oblique view of an array of offshore floater systems (780) for a wave electricity generator comprising lever arms (781) coupled with floaters (782) and rotatably coupled with one or more base members (not shown). The figure shows a possibility of coupling floater systems (780) variably into arrays in X-axis and/or Y-axis (and/or Z-axis) directions [e.g. by means of flexible shafts, joints, flexible connections, etc.] in various patterns [e.g. rows, hexagonal, star, V, Y, etc.] to efficiently exploit the wave energy. Offshore power networks [which can include or be coupled with other components such as frames, outrigger reactor means such as floats, supports, pipes, (flexible) mechanocomponents, moorings, (static/dynamic) anchoring structures, marine rechargeable power sources, offshore power production units, control units, mobility units, auxiliary buoyancy units, power and communication lines, power and communication interfaces, marine attachments, navigational aids, etc.] can be formed. A control system can operate the array in different modes [e.g. a storm mode, a partially activated array mode, a calm conditions mode, etc.]. The control system with a mobility system can deplace, rotate, etc., the array according to weather conditions and forecast and waves direction. Multiple generators utilized in an array can increase the reliability of the system in the event of a single failure. The arrays (780) can be anchored in multiple ways; a center anchor can be provided which can further house electronics, hydraulics, pneumatics, control elements, etc.; peripheral anchors, anchors arrays, combined static/dynamic systems, etc.

Figure 38:
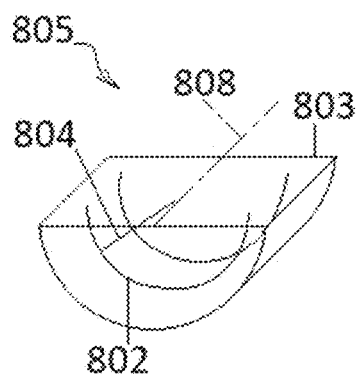
FIG. 38 is a schematic oblique view of a pendulum type electric energy generator which can be used in the proposed offshore floater system.

FIG. 38 is a schematic oblique view of a pendulum type electric energy generator (805) which can be used in the proposed offshore floater system. The generator (805) can include a stator (802) which can be coupled with a base member (803) and a rotor (804). The stator (802) and the rotor (804) can include magnetic elements [e.g. permanent magnets, electromagnets, coils, cores, backing plates, etc.]. A relative movement between the stator (802) and the rotor (804) can produce electricity. A lever arm (not shown) can pivot about an axis (808).

Figure 39:
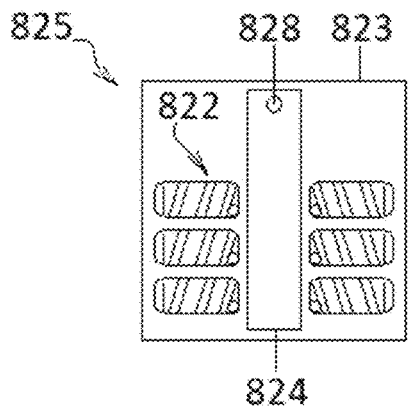
FIG. 39 is a schematic side view of a spring type electric energy generator which can be used in the proposed offshore floater system.

FIG. 39 is a schematic side view of a spring type electric energy generator (825) which can be used in the proposed offshore floater system. The generator (825) can include a stator (822) which can be coupled with a base member (823) and a rotor (824). The stator (822) and the rotor (824) can include magnetic elements [e.g. permanent magnets, electromagnets, coils, cores, backing plates, etc.]. A relative movement between the stator (822) and the rotor (824) can produce electricity. Shown is an axis (828) where can be coupled a lever arm (not shown). The illustration also shown a self regulating principle or an adaptive control which can be employed in power generation wherein one or more coils may be energized in various types of generators which can increase resistance and the ability of an armature to turn and at the same time by increasing the electrical field strength [which can be computer-optimized] increases the electrical power output of the generators. In this way a maximum amount of energy available in water in varying sea states can be captured. The illustration also shows that various damping structures can be used such as springs, dashpots, various schemes to vary damping and restoring forces, etc. Various controls can be provided to increase resistance such as pressure sensors, motion sensors, (roller) contacts, etc.

Figure 40:
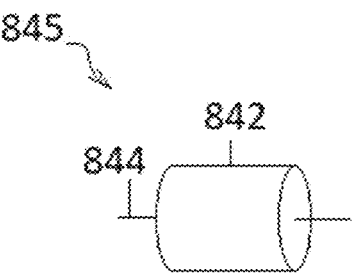
FIG. 40 is a schematic oblique view of a translational type electric energy generator which can be used in the proposed offshore floater system.

FIG. 40 is a schematic oblique view of a translational type electric energy generator (845) which can be used in the proposed offshore floater system. The generator (845) can include a stator (842) which can be coupled with a base member (not shown) and a mover (not shown) which can be coupled with external actuators (844) [which can be mechanical, pneumatic, electromagnetic]. The stator (842) and the mover can include magnetic elements and a relative movement can produce electricity. [For example in one non limiting example lever arms (not shown) can be coupled with a pulley system, a connecting rods system, etc., and alternately push or pull the external actuators (844).]

Figure 41:
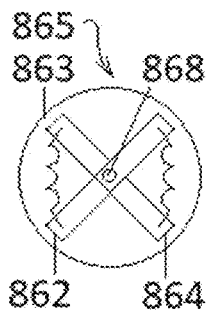
FIG. 41 is a schematic oblique view of a coil type electric energy generator which can be used in the proposed offshore floater system.

FIG. 41 is a schematic oblique view of a coil type electric energy generator (865) which can be used in the proposed offshore floater system. The generator (865) can include a stator (862) [which can be one or more coils, electromagnets, permanent magnets, etc.] which can be coupled with a base member (863) and a rotor (864) [which can be one or more permanent magnets, electromagnets, coils, etc.]. A relative movement between the stator (862) and the rotor (864) can produce electricity. Shown is an axis (868) where can be coupled a lever arm (not shown).

Figure 42:
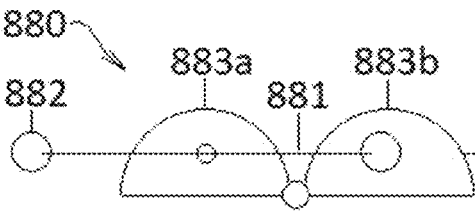
FIG. 42 is a schematic side view of another embodiment of an offshore floater system for a wave electricity generator with dynamically stabilized base members.

FIG. 42 is a schematic side view of another embodiment of an offshore floater system (880) for a wave electricity generator comprising lever arms (881) coupled with floaters (882) and rotatably coupled with base members (883a, 883b) which can be moored to be able to react on a water level change. The illustration shows a possibility of the invention to stabilize the base members (883a, 883b) by other means than coupling with the seabed [e.g. by mutual coupling and/or coupling with another buoyant or nonbuoyant construction, an existing land or offshore structure, a pre-built structure such as a pier, a breakwater, a weir, a (space) truss structure secured to a support structure, an oil rig, etc.] and then it shows that the base members (883a, 883b) may not necessarily be maintained in an upright position so that the system can be functional. The mooring system may further provide restraint or excitation to the system to influence its properties. The mooring system and/or the joints between the base members (883a, 883b) can be configured to (resonantly) respond to heave and sway motions of the elements in such a way as to maximize a power absorption and a power output [e.g. the base members (883a, 883b) can form a chain-like structure which length can be comparable to the incident wavelength to span at least two crests; in small waves the system can give a resonant response, in extreme waves various constraints may be provided so that the system give a benign response]. The base members (883a, 883b) can be located in tandem, can form chains, networks affixed to a common structural floating frame and allowed to articulate in the same manner (rectilinear or pivotal), etc.

Figure 43:
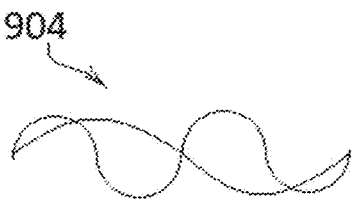
FIG. 43 is a schematic illustration of sea waves having various wavelength in a real off shore environment.

FIG. 43 is a schematic illustration of sea waves representing a real environment for an off shore installation of the proposed system. The illustration shows that the wavelength at sea (904) [or another off shore water] can differ and that for shorter wavelength the system may need a modification of lever arms. The solution of the problem is shown in FIG. 44.

Figure 44:
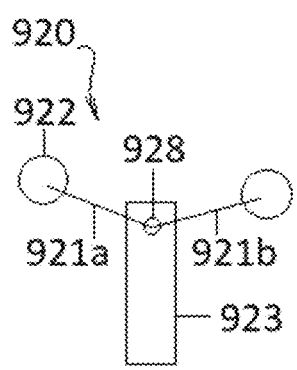
FIG. 44 is a schematic side view of another embodiment of an offshore floater system for a wave electricity generator comprising divisible lever arms.

FIG. 44 is a schematic side view of another embodiment of an offshore floater system (920) for a wave electricity generator comprising lever arms (921a, 921b) coupled with floaters (922) and rotatably coupled with a base member (923) which can be anchored to be able to react on a water level change. The illustration shows a possibility of the invention to remain functional for shorter wavelength by providing shorter lever arms (921a, 921b) [which can be provided as separate constructions coupled with an axis (928) and/or which can be lockable/unlockable to form one lever arm wherein various locking or controlling means can be provided such as mechanical, hydraulic, electromagnetic, etc., the lever arms (921a, 921b) can be coupled with various mechanocomponents such as shafts, clutches, freewheels, concentric components, etc.].

Figure 45:
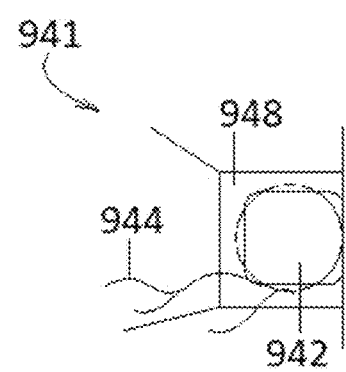
FIG. 45 is a perspective illustration of an interior of a lever arm providing a floater movements controlling structure.

FIG. 45 is a perspective illustration of a lever arm (941) which can be provided with floater movements controlling structures (948) [e.g. rubber barriers, springs, protrusions, notches, stops, controls, electromagnets, mechanical, pneumatic, hydraulic structures and/or actuators, and other regulating structures] which can passively or actively control a position of a floater (942) [e.g. a buoyancy force can pass the floater (942) through a rubber barrier at a certain threshold; sensing circuits can be provided and coupled with actuators, etc.] and provide a stabilizing effect on the energy output of the system. The arm (941) can be open to a throughflow of an offshore water (944).

Figure 46:
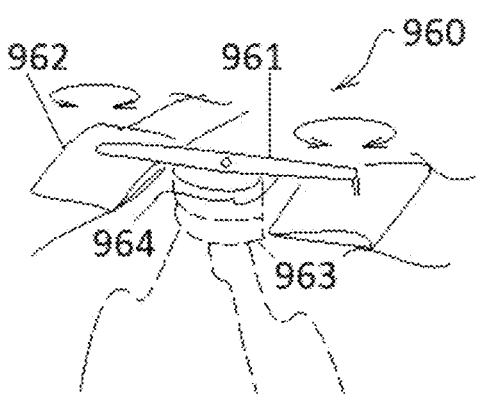
FIG. 46 is a schematic perspective illustration of another embodiment of an offshore floater system for a wave electricity generator with orientable wing floaters.

FIG. 46 is a schematic perspective illustration of another embodiment of an offshore floater system (960) for a wave electricity generator comprising a lever arm (961) coupled with floaters (962) [e.g. (multi-) wing floaters, disc floaters, etc., producing at least lifting forces and being rotatably coupled] and with a base member (963) which can be anchored to be able to react on a water level (964) change. The illustration shows a possibility of the invention to adapt the orientation of the floaters (962) to the undercurrents, wave directions, etc., to optimalize output of the system, to protect the system. The floaters (962) can be individually controllable, adjustable, etc., so as to affect an effective length of the arm (961) and the floaters (962) can further be optionally slidably mounted to the lever arm (961). The floaters (962) can have small depth and freeboard to provide complete submergence and emergence (hydrostatic-clipping) in large waves.

Figure 47:
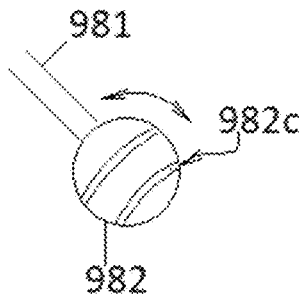
FIG. 47 is a perspective view of a floater reducing drag and generating lift.

FIG. 47 is a perspective view of a floater (982) optionally rotatably coupled with a lever arm (981) which can be used in the proposed system. The floater (982) can reduce drag with help of various means [e.g. hydrodynamical shape such as conical shape, slots (982c), hydrofoil profiles, blades, discs, wedges, etc.]. The floater (982) can generate lift with help of various means [e.g. with its buoyancy, hydrofoil profiles, etc.]. The connection between the floater (982) and the lever arm (981) can use various types of joints [e.g. from flexible materials such as rubber, freedom joints, universal joints (omni degree-of-freedom joints), ball-and-socket connections, sliding joints, hinges, etc.; the joints can enable various movement such as wobbling, rocking, etc., if desired] which can be controllable [e.g. mechanically, hydraulically, pneumatically, electromagnetically, naturally by the hydrodynamical shape, etc.; various types of motors, actuators, sensors, etc., can be used] so that a proper position of the floater (982) can be obtained.

Figure 48:
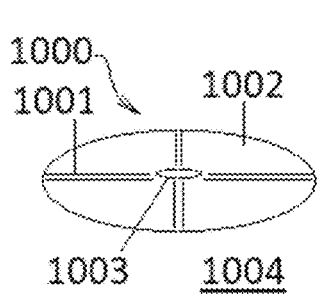
FIG. 48 is a schematic perspective illustration of another embodiment of an offshore floater system for a wave electricity generator with a continuous floater.

FIG. 48 is a schematic perspective illustration of another embodiment of an offshore floater system (1000) for a wave electricity generator comprising lever arms (1001) coupled with a floater (1002) [which can have a billowed surface and can be from a sheet of a rigid and/or flexible floating material such as polymers/e.g. heavy duty polyurethane (PU), polyethylene, polypropylene, polyamide, nylon, buoyancy plastics and/or from a network or chain-like structures of rigid floating bodies and flexible, articulated, etc., joints such as rubber joints, various mechanical joints, etc.; the floating materials and/or bodies can include cavities of various forms] and rotatably coupled with a base member (1003) which can be anchored to be able to react on a water level (1004) change so that the floaters (1002) and the base member (1003) can substantially follow contours of a wave (not shown). The lever arms (1001) and the floater (1002) can be of a fan design, a roll-up design, etc., to fold and unfold, conceal, etc., sections which system can be motor, hydraulics, wave-action, etc., actuated. If the floater (1002) is too flexible, development may be coordinated with the wave motion. The floater (1002) may be flexible to some degree to maintain a necessary stiffness [drag, turbulence considerations may be allowed]. Biological growths may be factor which may be further accounted for the system components design.

Figure 49:
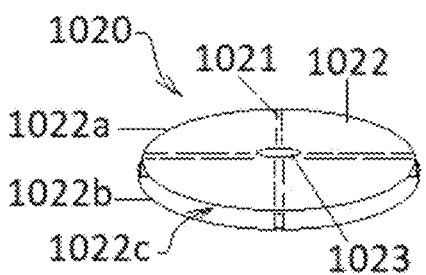
FIG. 49 is a variant of a system (1020) as shown in FIG. 48 with a multilayer continuous floater.

FIG. 49 is a variant of a system (1020) as shown in FIG. 48 wherein a floater (1022) can reduce drag and provide lift by means of a sandwiched structure which can include a throughflow space (1022c) [which can be further conveniently hydrodynamically shaped], an upper buoyancy structure (1022a) and a lower buoyancy structure (1022b) [wherein the buoyancies of the structures (1022a, 1022b) can be preset to determined values to obtain an optimal position of the floater structure (1022) in relation to waves and undercurrents to optimize the dynamic response of the system wherein either of the structures (1022a, 1022b) can be provided partially under the water level in various depths/e.g. within 1 cm from the crest, 0.5 m from the crest, etc.; the wave energy can be optimally collected up to L/2 depth from the sea surface wherein L is the wavelength, the distance of water particle travel at the L/2 depth is four percent of the distance of particle travel at the surface, energy is related to the square of the motion of water particles; 99.8 percent of the total energy is within the L/2 depth; water particle motions due to wave motion are nearly circular in deep water (the depth up to the L/2) and flatten to become flattened in shallow water (the depth less than L/20) and elliptical in between, with larger motions occurring near the surface and diminishing in orbital motion to the depth/; the buoyancies can be controllable by various means]. Lever arms (1021) can be optionally articulated to be able to follow contours of the waves, lever arm's portions can be coupled with power extraction systems, springs; different magnitudes of constraint may be applied to increase power capture according to waves parameters/e.g. by means of orientation of provided joints/; the lever arms (1021) can be actively or passively variable]. A base member (1023) can be anchored or moored by various means to be able to react on a water level change.

Figure 50:
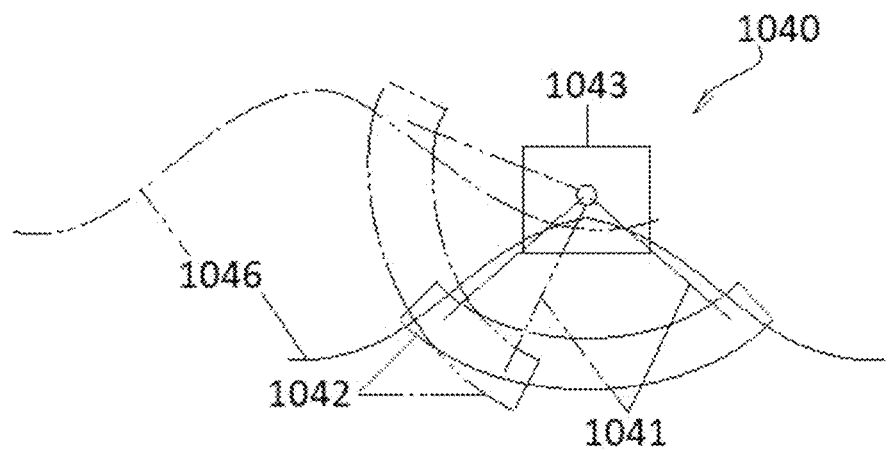
FIG. 50 is a schematic side view of another embodiment of an offshore floater system for a wave electricity generator comprising a substantially submerged floater.

FIG. 50 is a schematic side view of another embodiment of an offshore floater system (1040) for a wave electricity generator comprising a pendulum-like lever arm (1041) (shown in a median and an upper position) coupled with a floater (1042) [which can be from a bend tubular or similar form enabling throughflow or analogical construction constructed conforming to the fluid dynamics with various inflow, outflow openings and lines, valves, flow hampers, buoyancy and mass zones, etc.] and rotatably coupled with a base member (1043) [in various wave phases gravity and buoyancy forces can make the elements relatively oscillate or rotate] which can be anchored to be able to react on a water level change [e.g. by means of anchoring lines, guiding rails, spars, stabilizing fins, etc.] so that the floater (1042) and the base member (1143) [which can have comparatively great buoyancy] can follow contours of a wave (1046). The floater (1042) can be hidden at least partially in the natural water.

Figure 51:
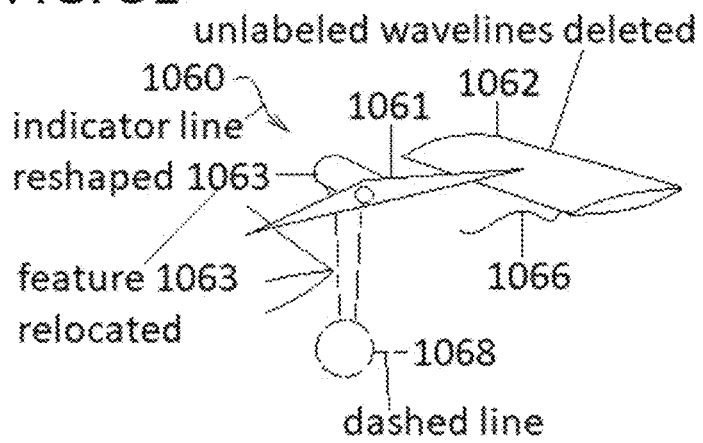
FIG. 51 is a schematic perspective view of another embodiment of an OFS provided with a stabilizing weight.

FIG. 51 is a schematic perspective view of another embodiment of an offshore floater system (1060) for a wave electricity generator comprising a lever arm (1061) coupled with floaters (1062) and rotatably coupled with a base member (1063) [which can be a buoyant or non-buoyant housing for electro- and mechanocomponents such as various shafts, gears, clutches and power electronics, communication electronics, etc.] which can be positioned between the floaters (1062) on the lever arm (1061) so that the floaters (1062) can follow contours of waves (1066). The lever arm (1061) can be via the base member (1063) coupled with a weight (1068) [which can have various shapes, forms and provide other functions/e.g. can host sensors, actuators, etc./] which can substantially keep the base member (1063) in a relatively vertical position which can ensure a relative rocking motion of the lever arm (1061) which kinetic energy can be further converted into other types such as a potential energy, an electric energy, etc. The illustration shows the embodiment in which the base member (1063) can be provided only in a splash (temporary) contact with an ambient water which can be advantageous for servicing, maintenance, components' accessibility, but also can have less demanding requirements in terms of watertight action in comparison with (constantly) fully submerged (pressurised) solutions.

Figure 52:
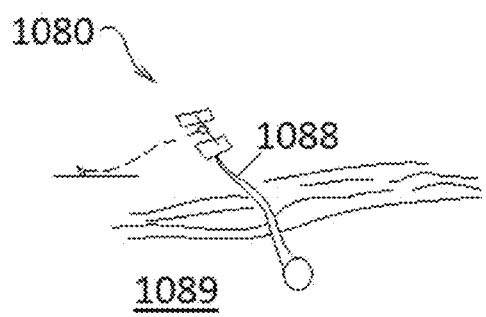
FIG. 52 is a schematic perspective illustration of an offshore installation of another embodiment of an OFS providing an onshore power.

FIG. 52 is a schematic perspective illustration of an offshore installation of another embodiment of an offshore floater system (1080) which can be coupled with the shore (1089) via a power cable (1088) [which can further perform a mechanical mooring function wherein in situ anchoring can be further provided by the system (1080)]. Various load types can be provided on shore such as power grids, electric motors, desalinations centers, industrial, recreational, etc., facilities, energy systems of engineering and/or architectural constructions, etc. The floater system (1080) can be "mobile", i.e. can be anchored ad hoc, temporarily, can be provided as a foldable kit, skid mounted kit, etc., can be deployed [e.g. from an onshore vehicle] if needed, or can be provided as relatively permanent [e.g. 20 years] offshore power installation, etc.

Figure 53:
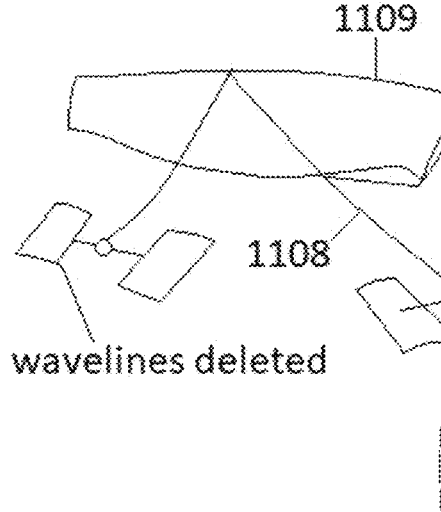
FIG. 53 is a schematic perspective illustration of an offshore installation of another embodiment of an OFS providing power to a water vessel.

FIG. 53 is a schematic perspective illustration of an offshore installation of another embodiment of an offshore floater system (1100) which can be coupled with a water vessel (1109) [which can be a commercial vessel, a multipurpose vessel, a power production vessel, etc.] via a power cable (1108) [wireless coupling via wireless power/communication interfaces can be contemplated as well/e.g. inductive, capacitive, magnetodynamic, electromagnetic, resonant, non-resonant, combinations, etc., powerline communication or other wired or wireless communication means can be provided]. Various load types can be provided by the vessel (1109) such as rechargeable power sources, hydrogen energy generation and storage systems, loads, auxiliary devices, electric motors, facilities, etc. The floater system (1100) can be "mobilele" [e.g. can be anchored by dynamic anchoring, demontable, modularly scalable, etc.].

Figure 54:
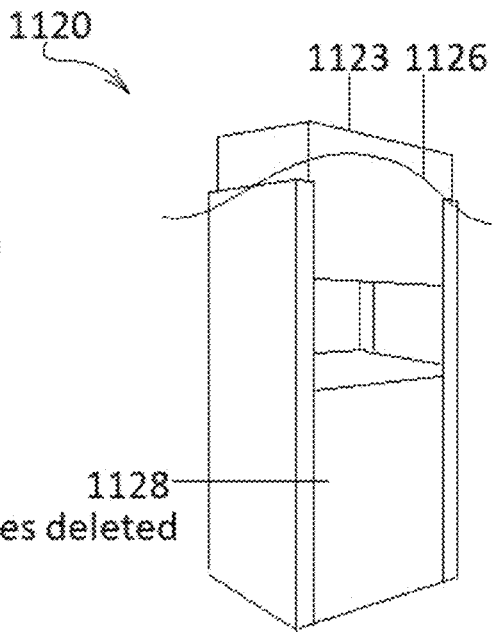
FIG. 54 is a schematic perspective illustration of an offshore installation of another embodiment of an OFS including a base floater and an underwater control module.

FIG. 54 is a schematic perspective illustration of an offshore installation of another embodiment of an offshore floater system (1120) which can be part of an offshore charging station for overwater and/or underwater vessels at least partially electrically driven which can comprise at least one rechargeable power source [e.g. providing traction power, auxiliary power, etc.] and which can include a base floater (1123) coupled with a static installation housing (1128) which can be modularly configured and can include a wave energy controller with power and communication modules adapted to particular system demands/e.g. on the rated operating voltage and current/]. One or more lever arms coupled with one or more floaters (not shown) can be rotatably coupled with the base floater (1123).

Figure 55:
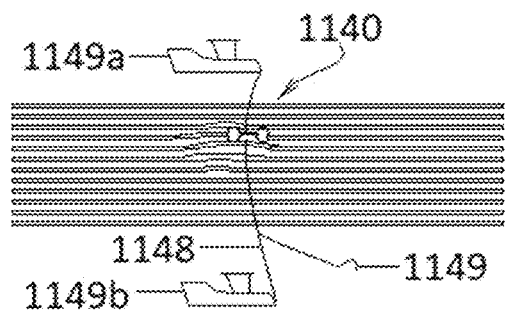
FIG. 55 is a schematic illustration of another offshore installation of a mobile OFS system.

FIG. 55 is a schematic illustration of another offshore installation of an offshore floater system (1140) which can be coupled with water vessels (1149a, 1149b) via a power/mooring cable (1148) wherein other anchoring systems [e.g. bottom anchoring systems (1149)] can be used. The illustration shows an advantage of a "mobile" system which can adapt to weather conditions and "track" waves. The illustration shows advantages of an easily deployable system for the wave electricity generation. The illustration shows the floater system (1140) with more anchoring and mooring points [or a combination of more anchoring systems inclusive of active and passive positioning systems] which can ensure a convenient orientation towards local incident waves to optimize the wave energy collection [or to move the system (1140) from a stormy area, etc.].

Figure 56:
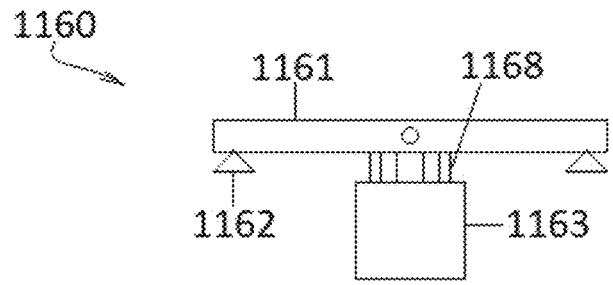
FIG. 56 is a schematic side view of another embodiment of an OFS comprising hydraulic and/or pneumatic pressure building systems, and hydraulic and/or pneumatic motors.

FIG. 56 is a schematic side view of another embodiment of an offshore floater system (1160) for a wave electricity generator comprising a lever arm (1161) coupled with floaters (1162) and rotatably coupled with a base member (1163) [which can be a buoyant or non-buoyant housing for hydraulic, pneumatic, power and communication systems, etc.] which can be positioned between the floaters (1162) under (or above, or in another position) the lever arm (1161) so that the floaters (1162) can follow contours of waves (not shown). The lever arm (1161) can be coupled with a pneumatic and/or hydraulic system (1168) [which can include respective hydraulic/pneumatic pressure building systems, hydraulic/pneumatic motors which can be coupled with or include an electric energy generator and/or a rechargeable power source, etc., to produce, respective to store the electric energy].

Figure 57:
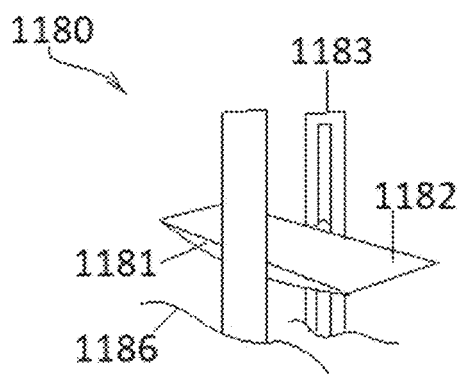
FIG. 57 is a schematic perspective view of another embodiment of an OFS with a vertically positionable central floater between two pylons comprising power electronics and mechanical systems.

FIG. 57 is a schematic perspective view of another embodiment of an offshore floater system (1180) for a wave electricity generator comprising a lever arm (1181) coupled with a floater (1182) [e.g. integrated into the floater body, forming a framework, etc.] and rotatably coupled with a base member (1183) [e.g. two parallel concrete pylons] housing mechanocomponents and electrocomponents (eventually pneumatic or hydraulic systems) and enabling hoisting and dropping the floater (1182) into waves (1186). [The shown embodiment can form a chain with multiple production units and any component of the system can be coupled with other green energy systems such as solar panels, wind energy systems, etc.]

Figure 58:
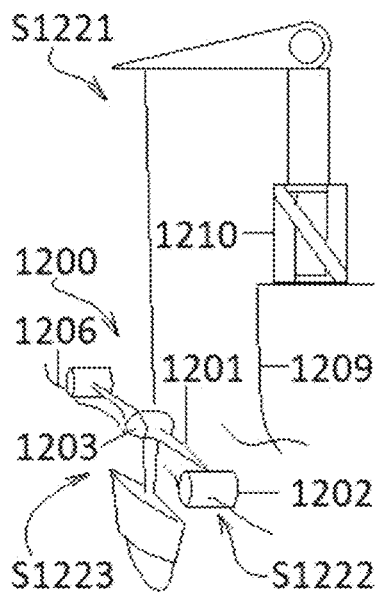
FIG. 58 is a schematic perspective illustration of an offshore floater method for generating wave electricity.

FIG. 58 is a schematic perspective illustration of an offshore floater method for generating wave electricity, the method comprising the steps of deploying an offshore floater electricity generator (1200) including one or more lever arms (1201) coupled with one or more floaters (1202) and rotatably coupled with a base member (1203) including or coupled with an electricity generator (not shown) [which can be provided inside in a watertight installation] (S1221);

swinging or rotating one or more lever arms (1201) with one or more floaters (1202) by water waves (1206) while simultaneously following contours of the waves (1206) by means of one or more floaters (1202) and/or the base member (1203) [which can mainly depend whether the base member is a floater and on wavelength of the system in comparison with waves' wavelength] (S1222);

generating electric energy by means of the electricity generator (1200) (S1223), wherein the steps can be repeated and/or reversed [that means that the system can be deployed, produce energy in situ and again e.g. loaded on a water vessel (1209) to a prepared container (1210)].

In a further step (not shown) an effective length [that means the length between working floaters (1202) and a fulcrum] of the lever arms (1201) can be adapted [i.e.

increased or decreased] according to wave parameters [e.g. a wavelength, a height, a frequency, etc.].

Figure 59:
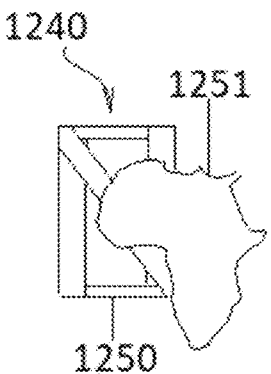
FIG. 59 is a schematic illustration showing geographical possibilities of the proposed system and method.

FIG. 59 is a schematic illustration showing the possibilities of the proposed system and method to deploy a (modularly designed) offshore floater electricity generator (1240) which can be fabricated in one area [e.g. U.S.] and prepared in a transportable packaging (1250) to supply the wave electricity for another area (1251).

Figure 60:
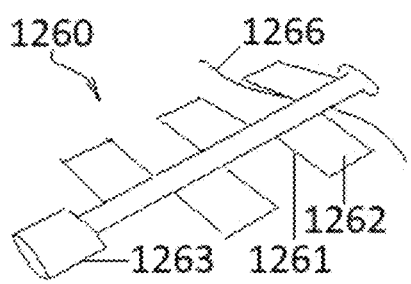
FIG. 60 is a schematic perspective view of a multiple axes OFS.

FIG. 60 is a schematic perspective view of another embodiment of an offshore floater system (1260) for a wave electricity generator comprising lever arms (1261) which can be an integral part [e.g. a framework, an iron core of a foam material, etc.] of floaters (1262) and rotatably coupled [e.g. by means of two axes] with a base member (1263) [which can be a buoyant casing for mechanical, power and communication components, etc.] which can be positioned between the two rows of floaters (1162) [which can be disposed in any other than shown pattern to collect the wave energy; the shown plurality of floaters can be substituted by two floaters; the plurality can be coupled with a common (flexible, articulated) shaft by means of one-way clutches, freewheels, etc.] so that the floaters (1262) can follow contours of waves (1266). The systems (1260) can be provided in chains, groups, etc. The both fulcrums can be stabilized in the waves (1266) by various means such as mechanical, hydraulic, pneumatic, electromagnetic constructions, springs, dampers, bottom rest supporting constructions, anchorings, moorings, buoyant anchored constructions, water vessels, onshore vehicles, etc.

Figure 61:
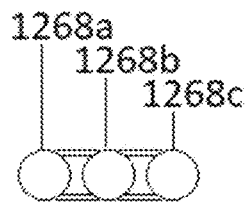
FIG. 61 is a front view of a multiple axes coupling for an OFS.

FIG. 61 is a front view of a mechanical coupling of three axes (1268*a*, 1268*b*, 1268*c*) which can be used in the proposed system. The illustration shows, that multiple axes as for example shown in the embodiment of FIG. 60 can be coupled by various means such as gears, variators, belts, chains, electromagnetic couplings, etc., so that a multiple secondary axes coupled in a rotative or swinging motion with floaters (not shown) can transfer the rotative or swinging motion [e.g. via a freewheel, or a (one-way) clutch, a lockable/unlockable coupling, etc.] to one or more primary axes coupled with an electric energy generator (not shown).

Figure 62:
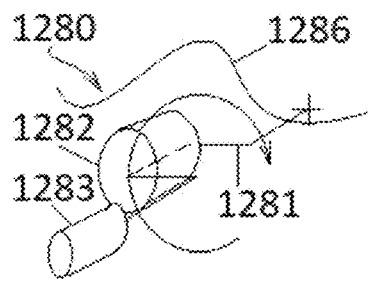
FIG. 62 is a schematic perspective view of another embodiment of an OFS with a crankshaft type lever arm.

FIG. 62 is a schematic perspective view of another embodiment of an offshore floater system (1280) for a wave electricity generator comprising a lever arm (1281) [which can have a form of a crankshaft which can have various shapes, include counterweights, have forms of discs or wheels with one or more floaters provided for example round the perimeter, etc.] which can be coupled with a floater (1282) and rotatably coupled with a base member (1283) [which can be buoyant or non-buoyant and which can house power and communication components, etc.]. The floater (1282) can follow contours of waves (1286) [e.g. can follow orbital movement of water particles; buoyancy of the floater (1282) can be controllable to position the system in different levels; various means can be used such as pneumatic, hydraulic, electromagnetic systems, valves, inlets, outlets, etc.; the buoyancy can be thermally controlled by various heating or cooling systems; the seas or oceans are stratified due to differences in density, with warmer, lighter, less salty water layering on top of heavier, colder, saltier water]. Fulcrums can be stabilized in the waves (1286) by various means [e.g. buoyant, or bottom rest supporting constructions].

Figure 63:
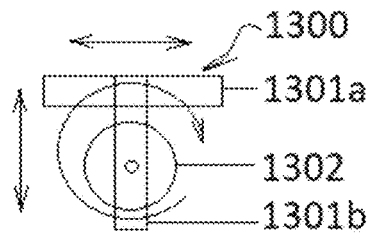
FIG. 63 is a schematic side view of another embodiment of an OFS converting x-axis and y-axis wave movement components into an useful energy.

FIG. 63 is a schematic side view of another embodiment of an offshore floater system (1300) for a wave electricity generator comprising lever arms (1301*a*, 1301*b*) [which can provide devices exploiting translational movement as shown or at least partially rotational/that means that the lever arms (1301*a* and 1301*b*) can be slidably, rollably, rotationably, etc., coupled/movement or combinations to collect x-axis and y-axis and/or rotational forces; the substantially horizontal arm (1301*a*) can couple more substantially vertical arms (1301*b*)] which can be coupled with a floater (1302) and rotatably coupled with a base member (not shown) [which can be buoyant or non-buoyant]. The floater (1302) can follow contours of waves (not shown) [e.g. can follow orbital, elliptic, flattened movement of water particles]. Fulcrums can be stabilized in the waves by various means [e.g. buoyant, or bottom rest supporting constructions]. The exploiting devices can be mechanical, pneumatic, hydraulic, electromagnetic. They can include various means to collect the wave energy and convert it into an useful energy such as electric energy, potential energy, etc. The devices can be pumps, gears, levers, pulleys, electromagnets. The lever arms (1301*a*, 1301*b*) can be mutually slidably, rollably, rotatably, etc. coupled. The whole of the system (1300) can be provided in an effective contact with an underwater environment affected by the wave action. Various sensing circuits can be used to determine this environment wherein the wave depth is only one of the potentially important parameters; further can be water velocity, direction, persistence, frequency, impact strength, etc., wherein accordingly various sensors can be provided. The whole of the system (1300) can be positioned to the sphere of influence where the wave energy can be collected by various means which can be buoyant and/or non-buoyant constructions inclusive of natural structures and/or constructions with other purposes such as oil platforms. Similarly various anchoring systems can be used inclusive of static and dynamic anchoring, position keeping, etc. Drones can be used or an autonomous drive system do deplace the system to the most appropriate underwater area.

Figure 64:
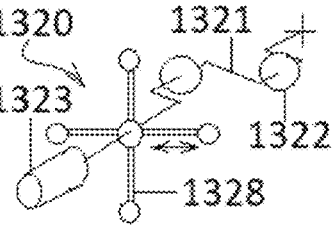
FIG. 64 is a schematic perspective view of another embodiment of a crankshaft type OFS with a variable flywheel.

FIG. 64 is a schematic perspective view of another embodiment of an offshore floater system (1320) for a wave electricity generator comprising a lever arm (1321) [which can have a form of a crankshaft] which can be coupled with floaters (1322) and rotatably coupled [e.g. via a variable flywheel (1328) which can change the momentum by various means, e.g. weights] with a base member (1323) [which can include an electric energy generator]. The floaters (1322) can follow contours of waves similarly as shown in FIG. 62 [freewheels can be provided on the crankshaft (1321) between the floaters (1322)]. Fulcrums can be stabilized in the waves by various convenient means.

Figure 65:
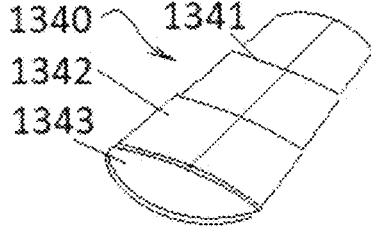
FIG. 65 is a schematic perspective view of another embodiment of an OFS with a telescopically stowable floater system.

FIG. 65 is a schematic perspective view of another embodiment of an offshore floater system (1340) for a wave electricity generator comprising lever arms (1341) which can be an integral part of floaters (1342) [which can be slidable, stowable, reefable, etc.] and rotatably coupled with a base member (1343) [which can contain mechanocomponents, electrocomponents and an electric energy generator]. The system may be easily transportable, deployable accordingly to the proposed method and modular.

Common Requirements

The components as shown in the drawings can have different layouts, proportions, orientations, materials, forms, shapes, etc. Features shown and described in the drawings and the description can be combined, interchanged, multiplied, etc. Some features can be omitted to maintain functionality of the proposed embodiments.

Offshore floater systems (OFSs) situated in seas or in oceans may be object of various tidal ranges varying from near zero to about 53.5 feet (16 meters) and averaging about 2 feet (0.6 meters) in the open ocean. In that case, level adjustable base members or level adjustable bottom rest supporting constructions may be designed to cope with a tidal range in a selected area for placement of the OFS. Passive (e.g. slack-line anchorages, sliding anchorages, etc.) and active anchorage systems (systems with active components) may be used to provide level adjustability.

The OFSs operated/temporarily operated under water level may provide atmospheric pressure in its inner space (e.g. in the container which can be filled with dry air, nitrogen, etc.) which may be advantageous for its electronic components or it may be kept at another pressure.

The OFSs may include further components enhancing their functionality such as installation spaces, connecting boxes, electricity meters, main switches, input/output terminals, fuse distributions, etc. The electronic control and communication components may be housed in electromagnetically shielded spaces. All electrical and electronical equipment may be particularly protected against moisture, salt water and grid to prevent failure of power and electronic components. External controls may be suitably adapted to function in offshore conditions. Subsea plugs, isolation bushings, cathodic protection and special resistive materials and anticorrosive surface treatments may be used.

Common Requirements on Offshore Charging Stations in Cold Areas

The OFSs may be situated offshore in the Arctic, the Antarctic, subpolar and cold seas. In that case, components of the OFSs may be designed to be conform with cold/extremely cold/temporarily cold conditions. A special insulation of offshore power cables (which may be posed on ice), power cables may be provided. A special thermal insulation of marine rechargeable power sources (e.g. rechargeable power sources in containers) may be provided. Thermal management systems of the OFSs and the marine rechargeable power sources may require heating systems.

No limitations are intended others than as described in the claims. The present invention is not limited to the described exemplary embodiments. It should be noted that various modifications of the OFS can be made without departing from the scope of the invention as defined by the claims.

The elements described in this specification and the used terminology reflect the state of knowledge at the time of the filling of this application and may be developed in the future.

INDUSTRIAL APPLICABILITY

The present invention may provide an offshore floater system (OFS) which can propose a compact design which makes it able to withstand harsh conditions at seas since the wave energy can be efficiently developed on open seas, the high seas, unprotected areas, etc. The design conforms the wave theory with practical requirements of the wave energy conversion. For environmental concerns, the device has the advantage of working in harmony with the offshore environment. The system can be deployed near docking facilities, offshore charging stations, recreational areas, etc.

The present invention can provide a technologically not complicated and easily to service offshore floater system which can generate wave electricity.

The proposed floater system configured to be able to adapt an effective length of a working lever arm to wave parameters and the proposed base member being able to react on a water level change can form a system which can bring a high efficiency in harvesting the wave energy.

The OFS in a cloud-based communication system may bring efficiency, flexibility, lower costs and lower $CO_2$ emissions of an OCS management.

The OFS installations at seas can be used to provide support for other sea energy harvesting devices such as solar energy systems, wind energy systems, hydrogen energy systems, reverse osmososis desalination systems, systems pumping cold water from the water body depths for airchilling systems, systems pumping water to a storage reservoir providing a supply of water to a hydraulic turbine, marine architecture and engineering systems, marine facilities such as industrial facilities, recreational facilities, shopping facilities, accommodation facilities, etc.

Such joined systems can be coupled with rechargeable power source systems such as rechargeable batteries, capacitors, hydrogen storage systems, etc. The systems can be further bidirectionally coupled with onshore and/or offshore transmission and/or distribution systems, smart systems, etc. The systems may provide a power reserve to be used for electricity production and supply by the OFS (e.g. in peak load times) or may be a principal power source for offshore or onshore loads.

The proposed modularity may concern all elements of the OPS and can bring functional and financial benefits to the parties. Modular designs may use various degrees of modularity [e.g. component slottability, platform systems, holistic approach, etc.]. Modules may be catalogued. Modules can be conveniently transported from an onshore production facility to an operating site off shore. Modularity can make possible to interconnect a plurality of modules to form a flotilla, a farm, etc., and to obtain as much of an offshore area energy as desired.

The proposed offshore floater method provided by the OPS may provide an effective method of harvesting sea energy.

I claim:

1. An offshore floater system for a wave electricity generator, comprising: one or more lever arms coupled with one or more floaters, wherein said one or more lever arms are rotatably coupled with a base member, wherein said one or more floaters and/or said base member are configured to substantially follow contours of one or more waves; wherein said one or more floaters are configured to be able to increase or decrease an effective length of said one or more lever arms according to wave parameters, the system characterized in that adjusting a buoyancy of said one or more floaters can adjust said effective length of said one or more lever arms.

2. The offshore floater system according to claim 1, further comprising at least one magnetic element being in a magnetic relation with at least one component of said offshore floater system.

3. The offshore floater system according to claim 1, wherein at least two of said floaters are differently sized.

4. The offshore floater system according to claim 1, wherein said one or more floaters and/or said base member have a defined form, wherein at least one said defined form is selected from spheres, spherical dishes, cylinders, circular cross-sections, elliptical cross-sections, oval cross-sections, convex faces, double convex faces, disc shapes, pontoons, buoys, tapered forms, forms with depressions, hydrodynamic shapes, irregular forms, two dimensional modelled shapes, three dimensional modelled forms, polyhedrons, blades, panels, airfoils, hydrofoils, floats reducing drag, floats generating lift, continuous floaters, multilayer constructions, tubular floats, floats enabling throughflow, or combinations thereof.

5. The offshore floater system according to claim 1, installed off shore.

6. The offshore floater system according to claim 1, wherein said base member is configured to be able to react on a water level change.

7. The offshore floater system according to claim 1, wherein said base member is substantially horizontally rotatably mounted to a supporting construction to be able to react on a wave direction.

8. The offshore floater system according to claim 1, wherein said one or more lever arms are coupled with an electric energy generator.

9. The offshore floater system according to claim 8, wherein said electric energy generator is a homopolar generator.

10. The offshore floater system according to claim 8, wherein said electric energy generator is coupled with an electrocomponent, wherein at least one said electrocomponent is selected from the group consisting of power cables, marine cables, communication interfaces, electronic devices, power devices, sensors, targets, actuators, antennas, amplifiers, resonators, rectifiers, filters, thyristors, semiconductors, inverters, converters, frequency converters, modulators, comparators, encoders, decoders, transformers, voltage regulators, power factor corrections, compensations, power electronics, controllers, processors, integrated circuits, timers, inductors, capacitors, shunts, resistors, diodes, varactors, switches, rechargeable power sources, power sources, distribution systems, transmission systems, smart grids, power grids, data transmission systems, the Internet, navigation systems, satellite navigation systems, source management systems, solar energy systems, wind energy systems, hydrogen energy systems, electric motors, motor generators, driving units, distributed electrocomponents, electrocomponents arrays, switchable electrocomponents, controllable electrocomponents, electric energy generators, coil cores, coil backing plates, coil backing sheets, magnetic conductors, electrical conductors, conductive bearings, slip rings, commutators, or combinations thereof.

11. The offshore floater system according to claim 1, wherein said one or more lever arms are coupled with a mechanocomponent, wherein at least one said mechanocomponent is selected from the group consiting of freewheels, flywheels, variable flywheels, hydraulic pressure building systems, hydraulic motors, hydraulic brakes, pneumatic pressure building systems, pneumatic motors, pneumatic brakes, heat pumps, heating systems, cooling systems, pressure modulators, springs, shock absorbers, weights, counterweights, balance weights, ballasts, pendulums, gyro mechanisms, shafts, cams, joints, connections, clutches, ratchets, gears, gearboxes, gear locking mechanisms, lockable/unlockable couplings, variators, reducers, multipliers, pulleys, belts, chains, toothed wheels, sprockets, pinions, crown wheels, racks, pistons, cylinders, connecting rods, compressors, pumps, filters, gas storage elements, fluid storage elements, reverse osmosis desalination systems, valves, conduits, actuators, brakes, transmissions, flexible components, adjustable components, thermally controlled buoyancy components, concentric components, keels, rudders, stabilizing fins, floats, float movements controlling structures, anchoring systems, mooring systems, sinkers, hoists, wires, ropes, seals, gaskets, bushes, underwater sails, water vessels, onshore vehicles, marine architecture systems, marine engineering systems, marine facilities, or combinations thereof.

12. The offshore floater system according to claim 1, providing data transmissions in relation with at least one of electricity production, servicing, controlling, managing, or combinations thereof.

13. The offshore floater system according to claim 1, controlled by a computing system, wherein at least one said computing system is selected from the group consisting of cloud computing systems, fog computing systems, edge computing systems, or combinations thereof.

14. The offshore floater system according to claim 1, designed to modularly scalable and/or exchangeable.

15. An offshore floater method for generating wave electricity, the method comprising the steps of:
deploying an offshore floater electricity generator including one or more lever arms coupled with one or more floaters and rotatably coupled with a base member including or coupled with an electricity generator, wherein said one or more floaters and/or said base member are configured to substantially follow contours of one or more waves, wherein said one or more floaters are configured to be able to increase or decrease an effective length of said one or more lever arms according to wave parameters, the system characterized in that adjusting a buoyancy of said one or more floaters can adjust said effective length of said one or more lever arms;
swinging or rotating said one or more lever arms with said one or more floaters by water waves while simultaneously substantially following contours of said waves by means of said one or more floaters and/or said base member;
generating electric energy by means of said electricity generator,
wherein the steps can be repeated and/or reversed.

* * * * *